(12) United States Patent
Sharma et al.

(10) Patent No.: US 11,030,409 B2
(45) Date of Patent: Jun. 8, 2021

(54) IDENTIFYING ATTRIBUTES ASSOCIATED WITH AN ENTITY USING NATURAL LANGUAGE PROCESSING

(71) Applicant: Accenture Global Solutions Limited, Dublin (IE)

(72) Inventors: Abhishek Datta Sharma, Delhi (IN); Madhura Shivaram, Bangalore (IN); Suraj Govind Jadhav, Mumbai (IN); Kaushal Mody, Mumbai (IN); Deepak Kumar, Kurmuri (IN); Guruprasad Dasappa, Bangalore (IN); Arvind Maheswaran, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/306,439

(22) PCT Filed: Aug. 19, 2016

(86) PCT No.: PCT/IB2016/054976
§ 371 (c)(1),
(2) Date: Nov. 30, 2018

(87) PCT Pub. No.: WO2018/033779
PCT Pub. Date: Feb. 22, 2018

(65) Prior Publication Data
US 2019/0163736 A1     May 30, 2019

(51) Int. Cl.
*G06F 40/295*     (2020.01)
*G06F 16/16*      (2019.01)
*G06F 16/93*      (2019.01)

(52) U.S. Cl.
CPC .......... *G06F 40/295* (2020.01); *G06F 16/164* (2019.01); *G06F 16/93* (2019.01)

(58) Field of Classification Search
CPC .................................................... G06F 40/295
See application file for complete search history.

(56) References Cited

U.S. PATENT DOCUMENTS 8,645,295 B1 * 2/2014 Dillard ............... G06Q 30/0278
                                                          706/20
9,092,428 B1 * 7/2015 Zhang .................... G06F 40/30
(Continued)

OTHER PUBLICATIONS

Extended European Search Report for Application No. EP16913468. 1, dated Mar. 9, 2020, 70 pages.
(Continued)

*Primary Examiner* — Shaun Roberts
(74) *Attorney, Agent, or Firm* — Harrity & Harrity, LLP

(57) ABSTRACT

A device may receive information associated with an entity. The information may include a first resource and a second resource. The first resource may be associated with a first file type, and the second resource may be associated with a second file type that is different than the first file type. The first resource may be associated with a first source, and the second resource may be associated with a second source that is different than the first source. The device may extract a plurality of attributes associated with the entity based on the information. The device may implement a natural language processing technique to extract the plurality of attributes. The device may associate the plurality of attributes with a plurality of elements based on extracting the plurality of attributes. The device may provide information that identifies the plurality of elements and the plurality of attributes to permit and/or cause an action to be performed.

20 Claims, 18 Drawing Sheets

(56) References Cited

U.S. PATENT DOCUMENTS

| | | | |
|---|---|---|---|
| 9,110,852 B1* | 8/2015 | Lerman | G06F 40/211 |
| 9,251,180 B2 | 2/2016 | Deshpande et al. | |
| 2008/0086363 A1 | 4/2008 | Kass et al. | |
| 2010/0250598 A1 | 9/2010 | Brauer et al. | |
| 2014/0006350 A1 | 1/2014 | Fukui et al. | |
| 2014/0297266 A1* | 10/2014 | Nielson | G06F 40/205 |
| | | | 704/9 |
| 2014/0372875 A1* | 12/2014 | Sugibuchi | G06F 16/358 |
| | | | 715/243 |

OTHER PUBLICATIONS

PCT International Search Report and Written Opinion of the International Search Authority corresponding to PCT/162016/054976, dated Apr. 11, 2016, 8 pages.

* cited by examiner

FIG. 5B

Peer Comparison

| Rank | Company Name | Sales (USD m) | Number of Emplo |
|------|--------------|---------------|-----------------|
| 1 | Entity A | 50,000 | 100,000 |
| 2 | Entity B | 44,000 | 96,000 |
| 3 | Entity C | 35,000 | 95,000 |
| 4 | Entity D | 32,000 | 84,000 |
| 5 | Entity E | 31,500 | 72,000 |
| 6 | Entity F | 26,000 | 70,000 |
| 7 | Entity G | 24,000 | 59,000 |
| 8 | Entity H | 23,000 | 51,000 |

⊕ Add    ✎ Edit    🗑 Delete

User
Administrator

Input
Data
Dashboard
Overview
Peer Comparison
530 — Services and Products
Financial Analysis
SWOT Analysis
Key Facts

FIG. 5G

| | Financial Analysis | | | |
|---|---|---|---|---|
| Categories | Sub-Categories | 31-Dec-2015 | 31-Dec-2014 | 31-Dec- |
| Business | Services | 12032000 | 45000040 | 451 |
| Business | Corporate | 14000220 | 4110000 | 653 |
| Allocated Funds | Long-Term Debt | 45800000 | 566100 | 87 |
| Allocated Funds | Common Equity | 895000 | 545440 | 195 |
| Cash Flow | Current Liabilities | 56000 | 5450000 | 65 |
| Cash Flow | Net Receivables | 4455000 | 7860080 | 4 |

(+) Add   ✎ Edit   🗑 Delete   ⟳ Re-Evaluate

User / Administrator

- Input
- Data
- Dashboard
  - Overview
  - Peer Comparison
  - Services and Products
  - Financial Analysis
  - 534 — SWOT Analysis
  - Key Facts

SWOT Analysis

SWOT Analysis | Custom SWOT Analysis — 536

Strengths:
Entity A has shown impressive revenues . . .

Weaknesses:
Entity A is involved in multiple legal proceedings . . .

Opportunities:
Entity A recently acquired Entity X and entered into a joint venture with . . .

Threats:
Increased regulatory requirements may . . .

Edit

User Name ▶
Administrator

Input
Data
Dashboard
Overview
Peer Comparison
Services and Products
Financial Analysis
SWOT Analysis
Key Facts

IDENTIFYING ATTRIBUTES ASSOCIATED WITH AN ENTITY USING NATURAL LANGUAGE PROCESSING

RELATED APPLICATIONS

This application claims priority to PCT Application No. PCT/IB2016/054976, filed on Aug. 19, 2016, and Indian Application No. 201747000685, filed on Aug. 19, 2016, the entire contents of both of these applications are incorporated herein by reference. All references cited anywhere in this specification, including the Background and Detailed Description sections, are incorporated by reference as if each had been individually incorporated.

BACKGROUND

Text documents may include information associated with an entity. A user (e.g., an analyst) may be required to analyze the text documents to identify particular information associated with the entity, and may be required to generate a report based on the particular information.

SUMMARY

In some possible implementations, a device may include one or more processors. The one or more processors may receive information associated with an entity. The information may include a first resource and a second resource. The first resource may be associated with a first file type, and the second resource may be associated with a second file type that is different than the first file type. The first resource may be associated with a first source, and the second resource may be associated with a second source that is different than the first source. The one or more processors may extract a plurality of attributes associated with the entity based on the information. The device may implement a natural language processing technique to extract the plurality of attributes. The one or more processors may associate the plurality of attributes with a plurality of elements based on extracting the plurality of attributes. The one or more processors may provide information that identifies the plurality of elements and the plurality of attributes to permit and/or cause an action to be performed.

In some possible implementations, a non-transitory computer readable medium may store instructions. The instructions may cause a processor to receive information associated with an entity. The information may be associated with a first resource and a second resource. The first resource may be associated with a first source, and the second resource may be associated with a second source that is different than the first source. The first resource may be associated with a first file type, and the second resource may be associated with a second file type that is different than the first file type. The instructions may cause the processor to extract a plurality of attributes based on the information associated with the entity. A first subset of attributes may be associated with the first resource, and a second subset of attributes may be associated with the second resource. The first subset of attributes may be extracted based on a first natural language processing technique, and the second subset of attributes may be extracted based on a second natural language processing technique. The instructions may cause the processor to associate the plurality of attributes with a plurality of elements. The instructions may cause the processor to provide information that identifies the plurality of elements and the plurality of attributes to permit and/or cause an action to be performed.

In some possible implementations, a method may include receiving, by a device and from another device via a network, information associated with an entity. The information may be associated with a plurality of sources, and the information may be associated with a plurality of file types. The method may include extracting, by the device, a plurality of attributes associated with the entity based on the information. The device may extract the plurality of attributes based on a natural language processing technique. The method may include associating, by the device, the plurality of attributes with a plurality of elements based on extracting the plurality of attributes. The method may include providing, by the device, information that identifies a report based on associating the plurality of attributes with the plurality of elements. The report may include a particular format. The plurality of elements and the plurality of attributes may be provided in association with the particular format.

DETAILED DESCRIPTION

The following detailed description of example implementations refers to the accompanying drawings. The same reference numbers in different drawings may identify the same or similar elements.

To inform decision making regarding an entity (e.g., a supplier, a vendor, a customer, etc.), an analyst may be required to aggregate information associated with the entity, analyze the information to identify particular information associated with the entity, and/or generate a report that includes the particular information associated with the entity. Additionally, the analyst may be required to conduct extensive research regarding the entity, determine and/or verify the accuracy of the aggregated information, and/or generate a report that adheres to a particular standard. Further, the analyst may be required to perform the above operations for a particular quantity of entities (e.g., competitors of the entity, etc.) in order to ascertain the viability of a particular entity (e.g., an ability of the entity to perform a service, provide a product, etc.). As such, this task may prove time intensive and/or error prone.

Implementations described herein enable an intelligence platform to receive information associated with an entity (e.g., resources associated with different sources, different file types, etc.), extract attributes associated with the entity and associate the attributes with elements (e.g., based on performing natural language processing techniques), and provide information that identifies the elements and associated attributes (e.g., in the form of a report). In this way, implementations described herein enable the intelligence platform to automatically generate reports regarding particular entities, thereby conserving processing resources associated with a user performing manual searches for information, aggregating the information, constructing the report, etc. Implementations described herein may utilize natural language processing techniques and/or machine learning techniques to automatically extract and associate information associated with an entity based on text documents, thereby increasing the speed and accuracy of information extraction, information association, and/or report generation.

Figure 1:
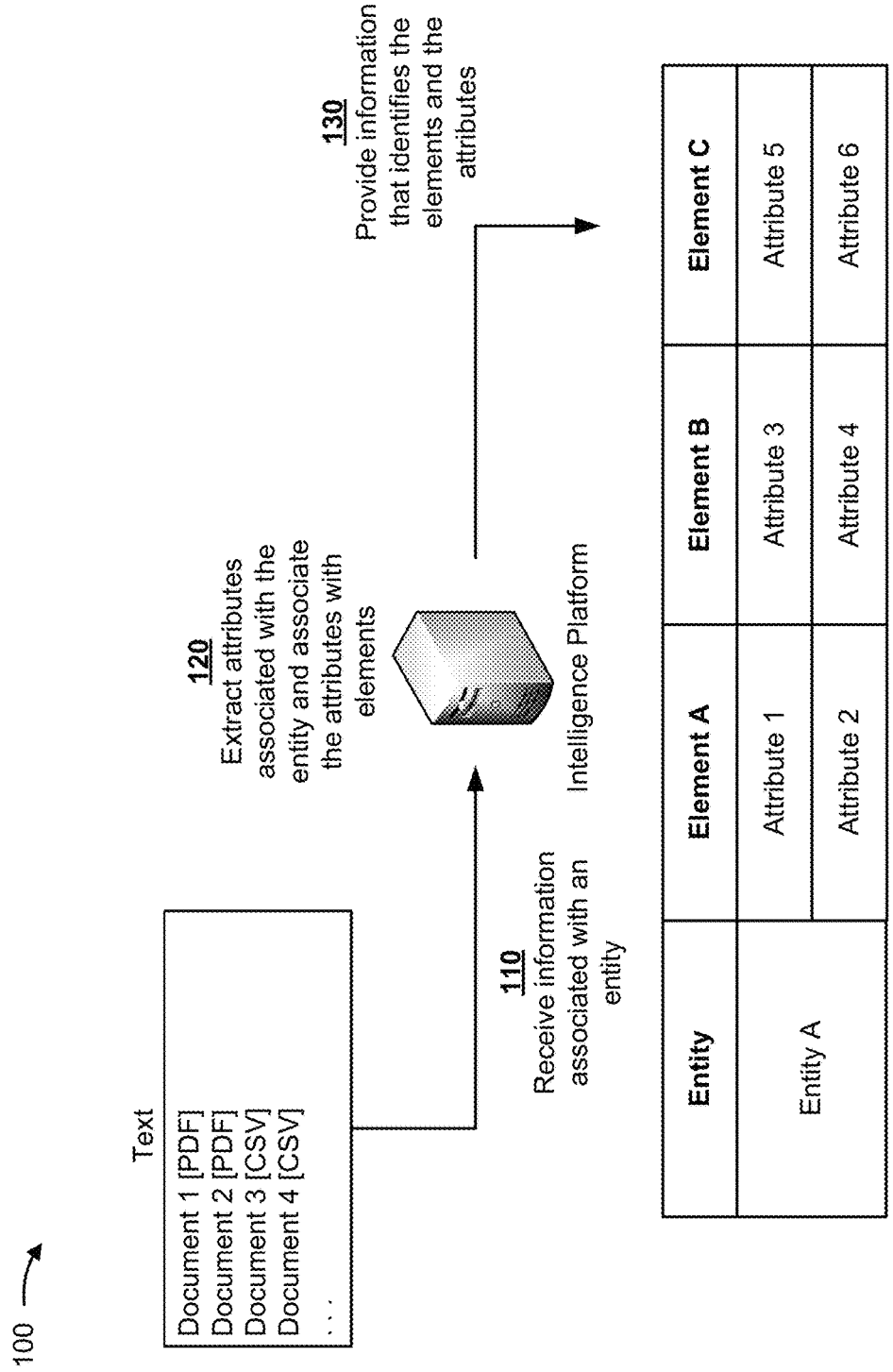
FIG. 1 is a diagram of an overview of an example implementation described herein.

FIG. 1 is a diagram of an overview of an example implementation 100 described herein. As shown in FIG. 1, and by reference number 110, an intelligence platform (e.g., a cloud server device) may receive information associated with an entity. For example, the intelligence platform may receive information that identifies an entity, information that identifies a resource identifier associated with the entity, or the like. Additionally, as shown, the intelligence platform may receive resources (e.g., documents that include text) based on the information. As an example, the intelligence platform may perform a web crawling technique, and may access the resources based on performing the web crawling technique. Additionally, as shown, the resources may be associated with different file types. Further, the resources may be associated with different sources. In other words, the intelligence platform may obtain resources of different file types and from different sources.

As further shown in FIG. 1, and by reference number 120, the intelligence platform may extract attributes associated with the entity and may associate the attributes with elements. For example, the intelligence platform may perform a natural language processing technique in association with the resources, and may extract attributes based on performing the natural language processing technique (e.g., may identify patterns associated with the text using regular expressions, or the like). An attribute may include, for example, information associated with the entity. Additionally, an element may include a category of information associated with the entity. As an example, an element may include a "mergers and acquisitions" category, and an attribute may include information that identifies a specific acquisition associated with the entity. The intelligence platform may associate an attribute with an element based on the natural language processing technique and/or based on a machine learning technique. For example, as shown, the intelligence platform may associate particular attributes (e.g., "Attribute 1" and "Attribute 2") with a particular element (e.g., "Element A").

As further shown in FIG. 1, and by reference number 130, the intelligence platform may provide information that identifies the elements and the attributes. For example, the intelligence platform may generate a report that includes information that identifies the elements, and information that identifies the attributes. As an example, the report may include a format that identifies sections associated with the elements, and may include information that identifies the corresponding attributes in association with a particular element.

In this way, the intelligence platform may receive information to process, may process the information to extract attributes and associate the attributes with elements, and may provide information that identifies the elements and the associated attributes. Implementations described herein enable an intelligence platform to automatically generate a report associated with an entity based on performing natural language processing techniques and/or machine learning techniques. In this way, implementations described herein increase the speed and accuracy of report generation, thereby conserving processing resources that otherwise may be consumed based on an analyst manually performing a search for the information and/or an analyst manually constructing a report. An analyst may use the generated report to identify a particular entity and/or assess a viability of a particular entity (e.g., to perform a service, provide a product, etc.).

As indicated above, FIG. 1 is provided merely as an example. Other examples are possible and may differ from what was described with regard to FIG. 1.

Figure 2:
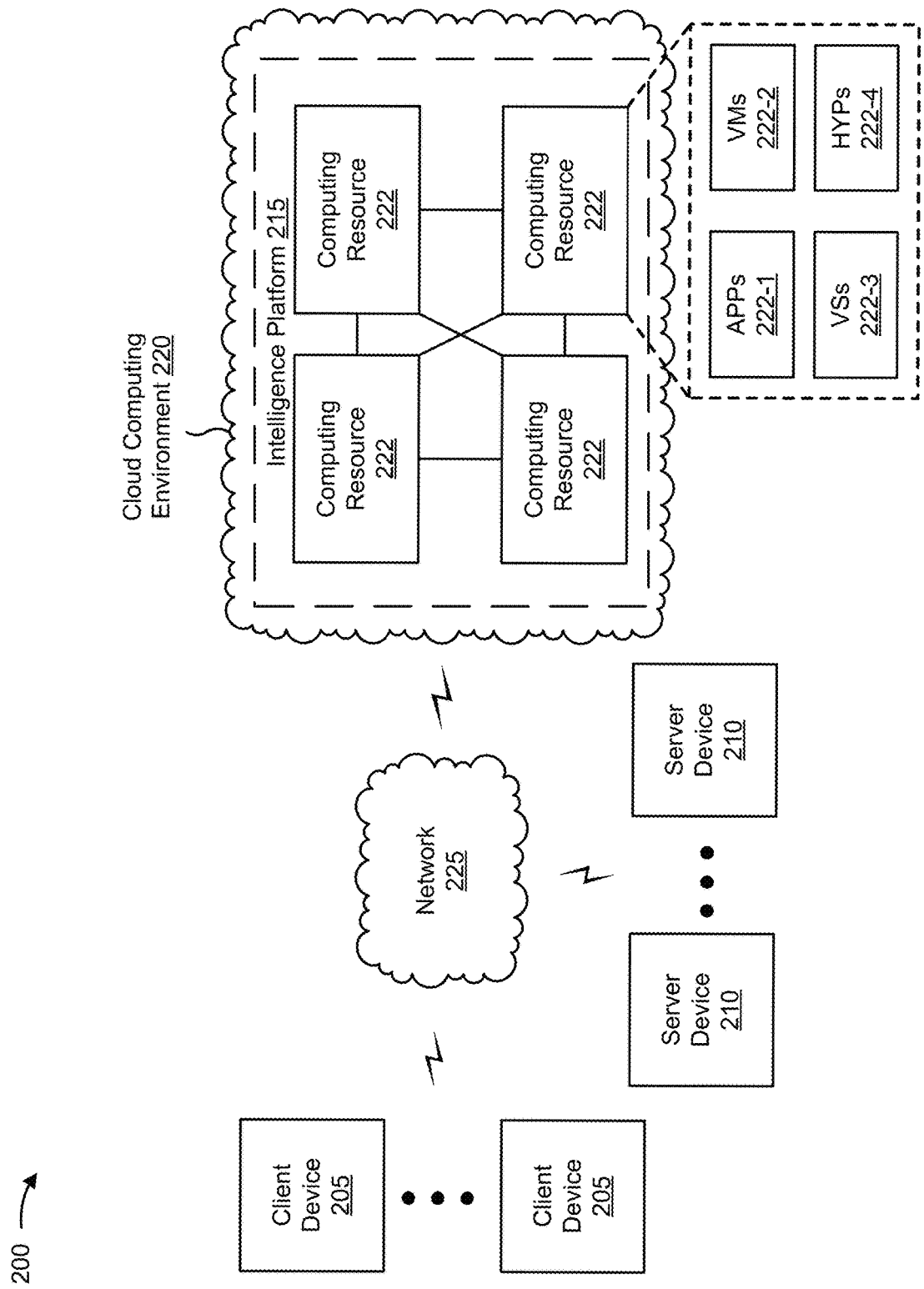
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include one or more client devices 205 (hereinafter referred to collectively as "client devices 205," and individually as "client device 205"), one or more server devices 210 (hereinafter referred to collectively as "server devices 210," and individually as "server device 210"), an intelligence platform 215 hosted within a cloud computing environment 220, and a network 225. Devices of environment 200 may interconnect via wired connections, wireless connections, or a combination of wired and wireless connections.

Client device 205 includes one or more devices capable of receiving, generating, storing, processing, and/or providing information associated with intelligence platform 215. For example, client device 205 may include a computing device, such as a desktop computer, a laptop computer, a tablet computer, a server device, a mobile phone (e.g., a smart phone or a radiotelephone) or a similar type of device.

Server device 210 includes one or more devices capable of receiving, storing, and/or providing information for use by intelligence platform 215. For example, server device 210 may include a server or a group of servers. In some implementations, intelligence platform 215 may obtain information associated with an entity, obtain resources to be processed, or the like, from server device 210.

Intelligence platform 215 includes one or more devices capable of receiving information associated with an entity, extracting attributes associated with the entity based on the information, associating the attributes with elements, and/or providing information that identifies the elements and attributes, as described elsewhere herein. For example, intelligence platform 215 may include a cloud server or a group of cloud servers. In some implementations, intelligence platform 215 may be designed to be modular such that certain software components can be swapped in or out depending on a particular need. As such, intelligence platform 215 may be easily and/or quickly reconfigured for different uses.

In some implementations, as shown, intelligence platform 215 may be hosted in cloud computing environment 220. Notably, while implementations described herein describe intelligence platform 215 as being hosted in cloud computing environment 220, in some implementations, intelligence platform 215 may not be cloud-based (i.e., may be implemented outside of a cloud computing environment) or may be partially cloud-based.

Cloud computing environment 220 includes an environment that hosts intelligence platform 215. Cloud computing environment 220 may provide computation, software, data access, storage, etc. services that do not require end-user (e.g., client device 205) knowledge of a physical location and configuration of system(s) and/or device(s) that hosts intelligence platform 215. As shown, cloud computing environment 220 may include a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host intelligence platform 215. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 includes a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 222-1 includes one or more software applications that may be provided to or accessed by client device 205. Application 222-1 may eliminate a need to install and execute the software applications on client device 205. For example, application 222-1 may include software associated with intelligence platform 215 and/or any other software capable of being provided via cloud computing environment 220. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., client device 205), and may manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 may provide hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Network 225 may include one or more wired and/or wireless networks. For example, network 225 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
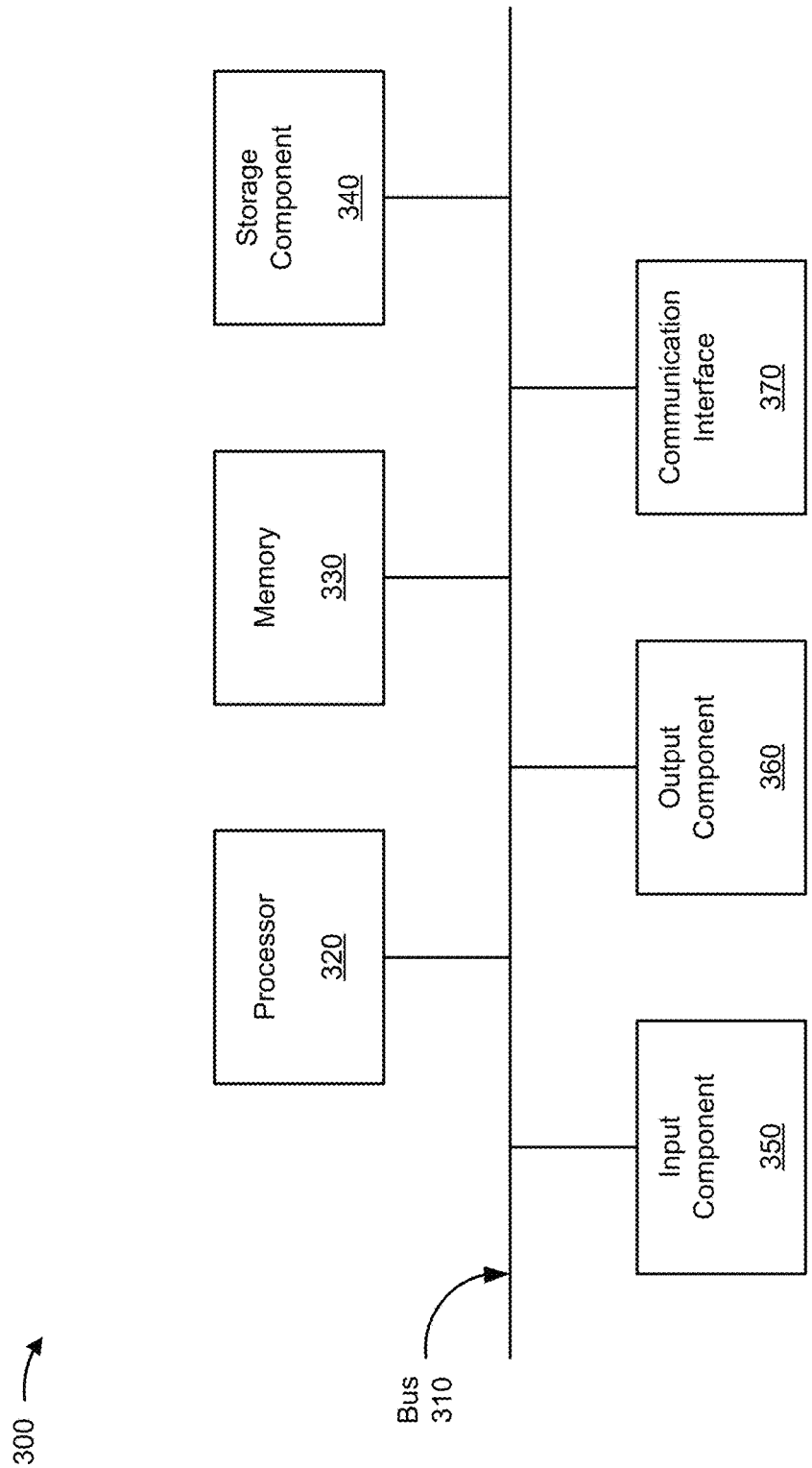
FIG. 3 is a diagram of example components of one or more devices of FIG. 2.

FIG. 3 is a diagram of example components of a device 300. Device 300 may correspond to client device 205, server device 210, and/or intelligence platform 215. In some implementations, client device 205, server device 210, and/or intelligence platform 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, an optical character recognition (OCR) reader, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
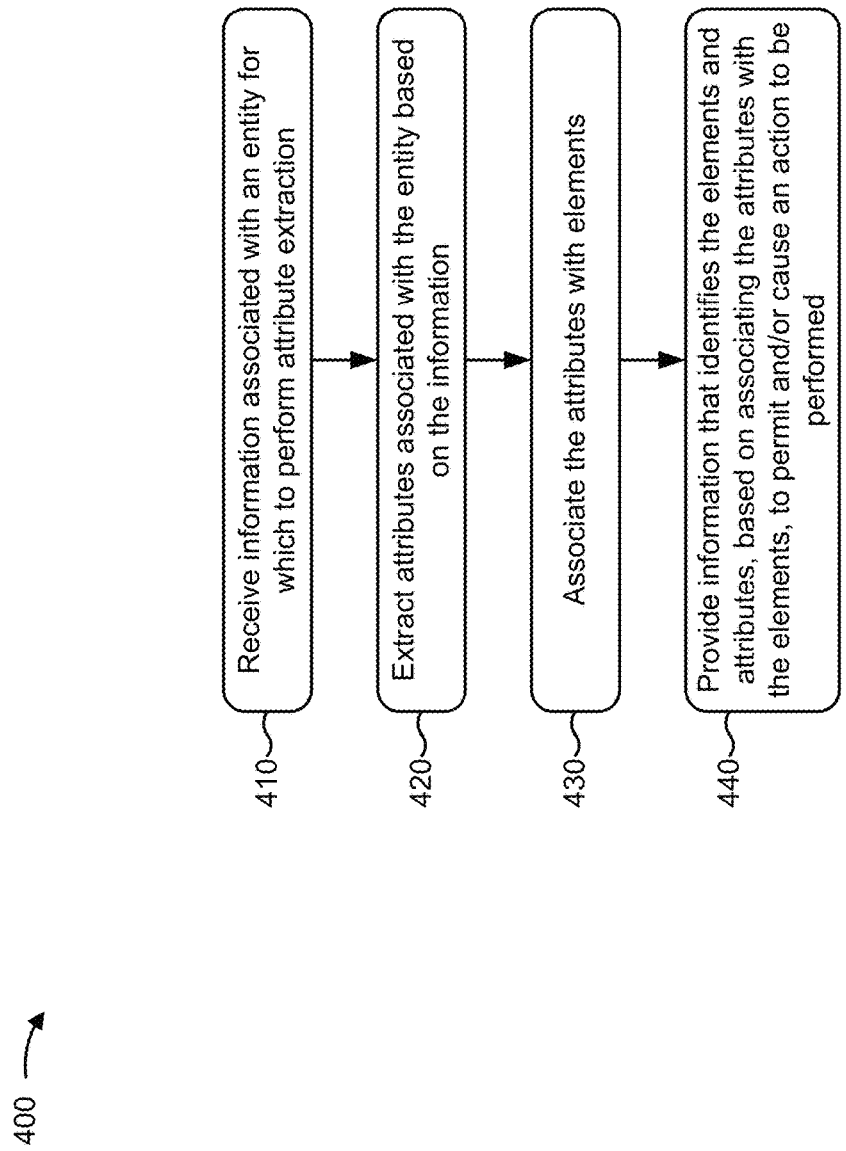
FIG. 4 is a flow chart of an example process for generating a report based on entity information.

FIG. 4 is a flow chart of an example process 400 for generating a report based on entity information. In some implementations, one or more process blocks of FIG. 4 may be performed by intelligence platform 215. In some implementations, one or more process blocks of FIG. 4 may be performed by another device or a group of devices separate from or including intelligence platform 215, such as client device 205 and/or server device 210.

As shown in FIG. 4, process 400 may include receiving information associated with an entity for which to perform attribute extraction (block 410). For example, intelligence platform 215 may receive, from client device 205 (e.g., which may have received an input from a user), information associated with an entity for which to perform attribute extraction. Additionally, or alternatively, intelligence platform 215 may receive information from server device 210. In some implementations, an entity may include an individual, a group of individuals, an organization, a business, an institution, or the like. As described elsewhere herein, an attribute may include information that relates to the entity.

In some implementations, the information associated with the entity may include an entity identifier (e.g., a string of characters that uniquely identifies an entity, such as a name, a title, a Data Universal Numbering System (DUNS) number, an Employer Identification Number (EIN), a social security number, or the like). In some implementations, the information associated with the entity may include a resource that includes text (e.g., a document, a webpage, or the like). Additionally, or alternatively, the information associated with the entity may include a resource identifier (e.g., a uniform resource identifier (URI), a uniform resource locator (URL), a uniform resource name (URN), a network address, a database address, or the like). Additionally, or alternatively, the resource may be associated with a particular file type and/or format (e.g., a hypertext markup language (HTML) file, an extensible markup language (XML) file, a text file, a comma-separated values (CSV) file, a portable document format (PDF) file, a Word file, an Excel file, a zipped file, or the like). Additionally, or alternatively, the resource may be associated with a particular source (e.g., an entity that generated the information associated with the resource, a device that stores the resource, or the like). In some implementations, the information may include multiple resources (e.g., documents, webpages, etc.) that may be associated with different file types and/or different sources.

In some implementations, intelligence platform 215 may receive the information associated with the entity based on a user input (e.g., via client device 205). For example, a user may interact with client device 205, and may input information that identifies an entity identifier, a resource identifier, or the like. In some implementations, intelligence platform 215 may store a profile associated with an entity. For example, a profile may include stored information associated with the entity. In some implementations, a user may interact with client device 205 to create and/or modify a profile associated with an entity (e.g., input resource identifiers, configure entity information, upload resources, or the like). Additionally, intelligence platform 215 may store information associated with the profile (e.g., in a data structure). In some implementations, a user may interact with client device 205 to modify a profile (e.g., input additional information, remove information, etc.). In this way, intelligence platform 215 may generate a report based on information associated with a profile (e.g., periodically, or the like).

In some implementations, intelligence platform 215 may obtain a resource that includes text to be processed based on the information associated with the entity (e.g., based on one or more resources associated with the entity). For example, intelligence platform 215 may receive, from client device 205, information that identifies text and/or a memory location at which the text is stored. Additionally, or alternatively, intelligence platform 215 may perform a technique (e.g., a web crawling technique, a web scraping technique, a data mining technique, a web searching technique, a database searching technique, or the like), and may receive text to be processed based on the technique. As an example, intelligence platform 215 may receive information that identifies a resource identifier (e.g., a URL, or the like) associated with the entity (e.g., associated with a webpage of the entity, associated with an encyclopedia webpage of the entity, or the like), and may obtain text to be processed based on the resource identifier (e.g., may access a resource using the resource identifier, may request a resource using the resource identifier, or the like).

As another example, intelligence platform 215 may receive information associated with an entity identifier (e.g., a name of the entity), and may retrieve text to be processed based on the entity identifier (e.g., by identifying a resource identifier using the entity identifier, by identifying another entity identifier associated to the entity identifier, or the like). In some implementations, intelligence platform 215 may perform a web search using an entity identifier, and may obtain text to be processed based on the web search. Additionally, or alternatively, intelligence platform 215 may perform web searches using different web search engines, and may receive text to be processed based on results associated with the web searches (e.g., may identify particular web pages, such as webpages associated with the top ten results, top twenty results, top one hundred results, or the like). Additionally, or alternatively, intelligence platform 215 may identify a score associated with a web page (e.g., indicating a relevancy of the web page to the entity), and may receive text to be processed based on web pages associated with scores that satisfy a threshold.

In some implementations, intelligence platform 215 may identify a web page associated with the entity based on the entity identifier (e.g., may identify an entity website, an encyclopedia website, or the like), and may receive text to be processed based on the web page. For example, intelligence platform 215 may perform a technique (e.g., a web scraping technique, a web crawling technique, a search technique, or the like), and may identify text to be processed based on the technique. Additionally, or alternatively, intelligence platform 215 may identify a list of URLS, and may search the list of URLs to identify a URL associated with the entity. Additionally, intelligence platform 215 may receive text to be processed based on the URL.

In some implementations, intelligence platform 215 may perform a technique (e.g., a web crawling technique) and may identify particular web pages associated with the entity (e.g., news articles, reports, documentation, etc.). For example, intelligence platform 215 may identify particular web pages (e.g., articles associated with the entity) that are associated with a particular source, and/or may identify particular web pages that are associated with a particular score (e.g., based on a popularity, based on a credential associated with the source, based on a quantity of other web pages that reference the web page, or the like). Additionally, or alternatively, intelligence platform 215 may identify particular web pages based on a time indicator (e.g., a time stamp, or the like) associated with the web pages (e.g., may identify web pages that are most recent, updated most recently, updated most frequently, or the like).

In some implementations, intelligence platform 215 may receive the information associated with the entity based on a time frame (e.g., may perform a web crawling technique, and may retrieve the information periodically, such as every day, every week, every month, etc.). In some implementations, intelligence platform 215 may determine whether to extract attributes based on a time indicator associated with a resource (e.g., based on comparing time stamps associated with resources, or the like). For example, intelligence platform 215 may periodically request a resource, and may determine whether the resource includes additional information (e.g., based on comparing a timestamp associated with a previous version of the resource).

As further shown in FIG. 4, process 400 may include extracting attributes associated with the entity based on the information (block 420). For example, intelligence platform 215 may perform a technique (e.g., a natural language text processing technique) to extract attributes associated with the entity. In some implementations, an attribute may include information that is associated with an entity, such as information that identifies a location associated with the entity, a product or service associated with the entity, a financial statistic associated with the entity, a related entity (e.g., a competitor, a partner, or the like), or the like.

In some implementations, intelligence platform 215 may obtain text (e.g., based on a user input and/or a resource), and may prepare the text for processing to extract attributes and/or associate the attributes with elements. In some implementations, intelligence platform 215 may determine text sections to be processed. For example, intelligence platform 215 may determine a manner in which the text is to be partitioned into text sections, and may partition the text into text sections. A text section may include, for example, a field, a sentence, a line, a paragraph, a page, a document, or the like. In some implementations, intelligence platform 215 may process each text section separately (e.g., serially or in parallel).

In some implementations, intelligence platform 215 may prepare the text for processing (e.g., one or more text sections). For example, intelligence platform 215 may standardize the text to prepare the text for processing. As an example, the text may be associated with different file types and/or different formats, and/or the text may include particular discrepancies relating to other text. In this way, intelligence platform 215 may standardize the text, such that the text may be represented in a particular format. In some implementations, intelligence platform 215 may identify a file type associated with the text, and may determine a technique to standardize the text based on the file type. As an example, intelligence platform 215 may identify that particular text is associated with a first file type (e.g., a CSV file), and may implement a particular technique to standardize the text. Further, intelligence platform 215 may identify that other text is associated with a second file type (e.g., a PDF file), and may implement a different technique to standardize the text. For example, intelligence platform 215 may perform optical character recognition to identify text associated with the document, or the like.

In some implementations, intelligence platform 215 may prepare the text for processing by adjusting characters in the text, such as by removing characters, replacing characters, adding characters, adjusting a font, adjusting formatting, adjusting spacing, removing white space, or the like. For example, intelligence platform 215 may replace multiple spaces with a single space, may insert a space after a left parenthesis, a left brace, a left bracket, etc., may insert a space before a right parenthesis, a right brace, a right bracket, etc. In this way, intelligence platform 215 may use a space delimiter to more easily parse the text. In some implementations, intelligence platform 215 may further prepare the text for processing by expanding acronyms in the text, determining words in the text (e.g., by determining characters identified by one or more delimiting characters), associating part-of-speech tags (POS tags) with words in the text, or the like.

In some implementations, intelligence platform 215 may identify terms included in the text, and may generate a corpus of terms by generating a data structure that stores terms extracted from the text. A term may refer to a set of characters, such as a single character, multiple characters (e.g., a character string), a combination of characters that form multiple words (e.g., a multi-word term, such as a phrase, a sentence, or a paragraph), a combination of characters that form an acronym, a combination of characters that form an abbreviation of a word, a combination of characters that form a misspelled word, or the like. Additionally, or alternatively, intelligence platform 215 may receive information that identifies particular terms to be used to perform attribute extraction and/or association. By generating the data structure that stores terms extracted from the text, intelligence platform 215 may process the text more efficiently than if the text were processed without first generating the data structure, thereby conserving processor and memory resources.

In some implementations, intelligence platform 215 may extract an attribute associated with an entity based on identifying a pattern in the text. For example, intelligence platform 215 may identify a pattern in the text (e.g., a particular sequence and/or combination of characters, words, terms, etc. that appear in the text), and may extract an attribute associated with an entity based on identifying the pattern in the text. In some implementations, intelligence platform 215 may extract an attribute associated with an entity based on identifying a particular pattern (e.g., a particular sequence and/or combination of characters, words, terms, etc. that appear in the text), such as by using a regular expression, a basic regular expression, an extended regular expression, or the like. For example, intelligence platform 215 may identify a term associated with an element, and may extract an attribute based on identifying other terms in relation to the term associated with the element.

In some implementations, intelligence platform 215 may utilize another technique (e.g., a machine learning technique, such as a pattern recognition technique, a data mining technique, a heuristic technique, a supervised learning technique, a classification technique, or the like) to process the text and extract an attribute associated with the entity. For example, a technique may receive, as input, information that identifies known attributes and corresponding text associated with the known attributes (e.g., corresponding terms, corresponding terms associated with particular POS tags, corresponding sequences of terms, corresponding patterns, or the like), and may correlate the corresponding text with the known attributes.

As an example, intelligence platform 215 may receive information that identifies that a particular sequence of terms (e.g., that includes a term associated with the entity, another particular term, and/or additional terms) is associated with an attribute. Additionally, intelligence platform 215 may correlate the particular sequence of terms with the attribute. Additionally, or alternatively, intelligence platform 215 may receive information that identifies text that is associated with a known attribute, and may extract a pattern that is associated with the known attribute (e.g., may identify particular terms, a particular sequence of terms, or the like). As an example, intelligence platform 215 may receive information (e.g., multiple documents, multiple text sections, etc.) that is associated with a known attribute, and may identify underlying terms, sequences of terms, or the like. Additionally, intelligence platform 215 may correlate the underlying terms, sequences of terms, or the like, with the known attribute. In this way, intelligence platform 215 may receive additional text, may identify the particular sequence of terms, and may extract an attribute based on the particular sequence of terms.

In some implementations, intelligence platform 215 may receive information that identifies classifications associated with text (e.g., particular terms, particular sequences of terms, particular terms including particular term frequency-inverse document frequency (tf-idf) scores, or the like), and may correlate the classifications with the text, and/or may correlate a classification with an attribute. In some implementations, the tf-idf score for a term may indicate a relative importance of the term as compared to other terms in the text.

In some implementations, a first term that is associated with a higher tf-idf score may represent an attribute associated with a particular element (e.g., a strength, a weakness, an opportunity, a threat, or the like), and a second term that is associated with a lower tf-idf score may not represent an attribute associated with the particular element. For example, intelligence platform 215 may determine a tf-idf score associated with a term in the text, and may classify a text section that includes the term based on the tf-idf score. In some implementations, intelligence platform 215 may receive text, and may process the text based on the classifications. In some implementations, intelligence platform 215 may implement a technique (e.g., a machine learning classification technique) based on the classifications and/or attributes obtained from the tf-idf scores. For example, intelligence platform 215 may implement a technique and extract an attribute associated with an entity based on tf-idf scores.

In some implementations, intelligence platform 215 may implement information extraction (e.g., may perform entity recognition, may identify relationships between an entity and another term in the text, may parse text based on syntactic structure, or the like), and may extract an attribute based on implementing the information extraction. In this way, intelligence platform 215 may associate the extracted attributes with elements, as described below. Additionally, in this way, intelligence platform 215 may implement one or more techniques that may increase the accuracy of attribute extraction, thereby reducing a quantity of additional information processing and conserving processor and memory resources.

As further shown in FIG. 4, process 400 may include associating the attributes with elements (block 430). For example, intelligence platform 215 may associate attributes with elements based on performing a natural language processing technique. In some implementations, intelligence platform 215 may associate an attribute with an element based on extracting the attribute. For example, intelligence platform 215 may store (e.g., in a data structure) information that relates an attribute with an element.

In some implementations, an element may include a category associated with an attribute, a set of attributes, etc. As an example, an element may include a category of attributes (e.g., related entities), and an attribute may include a particular related entity (e.g., a competitor associated with the entity, or the like). In some implementations, intelligence platform 215 may associate an attribute with an element based on an identified pattern in the text. For example, intelligence platform 215 may identify a particular term, or set of terms, associated with an element, and may extract an attribute associated with the element based on an identified pattern associated with the particular term. Additionally, intelligence platform 215 may associate the attribute with the element based on the identified pattern. For example, intelligence platform 215 may identify a particular text section (or text sections) that is associated with an identified pattern, and may associate the text section with the element.

In some implementations, intelligence platform 215 may associate an attribute with an element based on a particular source of the text, a file type associated with the text, a particular text section that includes the extracted attribute, or the like. Additionally, or alternatively, intelligence platform 215 may implement a particular technique (e.g., a natural language processing technique, such as using a regular expression) based on a particular source associated with the text. For example, intelligence platform 215 may use a first regular expression in association with a first source, and may use a second regular expression in association with a second source. Additionally, intelligence platform 215 may associate extracted attributes, associated with the first source and the second source, with particular elements based on the particular regular expression that was used to extract the attribute(s).

In some implementations, intelligence platform 215 may associate an attribute with an element based on one or more techniques (e.g., algorithms, machine learning, computational statistics, artificial intelligence, etc.). For example, intelligence platform 215 may implement a technique that associates attributes with elements. In some implementations, the technique may receive, as input, information identifying known attributes and known elements, and may correlate the known attributes with the known elements (e.g., using machine learning, computational statistics, artificial intelligence, or the like). Additionally, or alternatively, intelligence platform 215 may receive information that identifies particular terms to be used in association with the technique (e.g., to train a model, or the like).

In some implementations, intelligence platform 215 may receive an attribute (e.g., an attribute and/or text associated with the attribute, such as a particular quantity of text sections surrounding the attribute, or the like), and may implement the technique to associate the attribute with an element. Additionally, or alternatively, intelligence platform 215 may generate a score that indicates a level of confidence associated with the association.

In some implementations, intelligence platform 215 may receive an attribute, and may determine a classification of the attribute. For example, intelligence platform 215 may classify an attribute based on a term associated with the attribute, a quantity of terms associated with the attribute (e.g., particular terms that are associated with a text section that includes the attribute), or the like.

In some implementations, intelligence platform 215 may receive information that identifies a user modification of an associated attribute. For example, assume that intelligence platform 215 associates a particular attribute with a particular element. Further, assume that a user interacts with intelligence platform 215 and modifies the association (e.g., associates the attribute with another element, disassociates the attribute and the element, or the like). In this case, intelligence platform 215 may receive information that identifies the modification, and may implement a technique (e.g., a machine learning technique) based on the information that identifies the modification. In this way, intelligence platform 215 may receive information that identifies attributes, and may associate the attributes with elements based on implementing the technique.

As further shown in FIG. 4, process 400 may include providing information that identifies the elements and the attributes, based on associating the attributes with the elements, to permit and/or cause an action to be performed (block 440). For example, intelligence platform 215 may provide, to another device, such as client device 205 and/or server device 210, information that identifies the elements and the attributes to permit and/or cause an action to be performed. In some implementations, intelligence platform 215 may provide, to client device 205 (e.g., which may provide for display via a user interface), information that identifies the elements and the attributes. For example, client device 205 may provide information that identifies the elements in association with particular attributes for display. A user (e.g., an analyst) may interact with client device 205 to identify element and attributes associated with the entity, edit information associated with the elements and attributes, or the like. In this way, intelligence platform 215 may conserve processor and/or memory resources based on reducing a quantity of processing needed to aggregate information associated with an entity and/or input the information via client device 205.

In some implementations, intelligence platform 215 may perform the action to generate a report based on the elements and the attributes. For example, intelligence platform 215 may generate a resource, such as a document (e.g., a text document, a PDF document, a PowerPoint document, or the like), that includes information associated with the elements and the attributes. In some implementations, a report may be associated with one or more templates. A template may indicate a particular format for a report. For example, a template may indicate particular elements that are to be included in the report, may indicate an order of the elements, may indicate infographics that are to be included in the report (e.g., plots, charts, graphs, etc.), may indicate a quantity of attributes that are to be included in the report, or the like.

In some implementations, intelligence platform 215 may identify a template, of a group of multiple templates, based on the elements and the attributes associated with the entity (e.g., based on the extracted attributes). For example, intelligence platform 215 may determine a quantity of attributes (e.g., a quantity of information associated with the entity), may determine elements that are associated with the attributes, and may identify a template based on the quantity of attributes and/or elements. As an example, intelligence platform 215 may determine that attributes were extracted for particular elements, and may identify a template that includes the particular elements, that includes a subset of the particular elements, or the like. In some implementations, intelligence platform 215 may receive information that identifies particular attributes and/or elements to be included in a report (e.g., based on a user input). Additionally, or alternatively, intelligence platform 215 may receive information that modifies an attribute, an element, an infographic, or the like.

In some implementations, intelligence platform 215 may generate a report, and may provide, to client device 205, information that identifies the report. In this way, a user may interact with client device 205 to view the report, access the report, etc. Additionally, or alternatively, intelligence platform 215 may provide a resource identifier, associated with the report, and may provide the resource identifier to client device 205.

In some implementations, intelligence platform 215 may permit and/or cause another action to be performed based on the elements and the attributes. For example, intelligence platform 215 may cause a message (e.g., an email or a short message service (SMS) message) to be sent to client device 205 based on the elements and the attributes. In this way, intelligence platform 215 may notify a user that an entity is associated with particular information (e.g., based on the elements and the attributes). Additionally, in this way, intelligence platform 215 may notify a user of particular information associated with an entity and may reduce a need of the user to cause client device 205 to perform a search for the information, thereby conserving processing and/or memory resources of client device 205.

Additionally, or alternatively, intelligence platform 215 may coordinate client devices 205 based on the elements and the attributes. For example, intelligence platform 215 may coordinate client devices 205 (e.g., coordinate calendar applications associated with client devices 205 to schedule a meeting), and may provide information identifying an element and/or an attribute (e.g., to be displayed in association with a calendar application). In this way, a user may receive an indication that a meeting has been scheduled to discuss the entity, an element, and/or an attribute. As an example, assume that an element (e.g., a SWOT element) includes an attribute that identifies a particular threat, issue, opportunity, etc. associated with the entity. In this way, a meeting may be scheduled to discuss the entity. Additionally, in this way, intelligence platform 215 may reduce a quantity of processing needed to identify information associated with the entity, thereby conserving processing and/or memory resources of client devices 205.

Additionally, or alternatively, intelligence platform 215 may cause a policy, associated with an entity, to be generated and/or updated based on the elements and the attributes. For example, intelligence platform 215 may analyze attributes associated with the entity, and may cause a policy to be generated and/or updated based on analyzing the attributes. As an example, assume that intelligence platform 215 identifies that an entity is associated with a particular attribute (e.g., a particular quantity of employees), and that the entity is associated with another attribute (e.g., a quarterly revenue amount that satisfies a threshold value). In this case, intelligence platform 215 may cause a policy to be updated based on the identified information (e.g., may cause a payment structure to be modified, or the like).

Additionally, or alternatively, intelligence platform 215 may cause a budget associated with an entity to be updated based on identifying particular attributes associated with the entity. For example, intelligence platform 215 may identify budgetary risks based on identified attributes, and may cause a budget to be updated to accommodate a particular risk (e.g., may allocate resources towards a risk area or may prevent resources from being allocated towards a particular risk area). Additionally, or alternatively, intelligence platform 215 may cause accounting software to be modified. Additionally, or alternatively, intelligence platform 215 may cause a loan to be approved for an entity based on the attributes. For example, intelligence platform 215 may analyze attributes associated with an entity (e.g., a financial statistic, or the like), and may determine that the entity qualifies for a loan (e.g., may determine that one or more values, associated with attributes, satisfy threshold values). In this way, intelligence platform 215 may assist an entity in managing financial risk based on an identified attribute.

Additionally, or alternatively, intelligence platform 215 may permit a user to access text and/or a resource associated with an identified attribute. For example, intelligence platform 215 may provide information (e.g., for display via client device 205) identifying and/or including resources (e.g., documents, etc.) that include particular attributes. In some implementations, intelligence platform 215 may provide information that identifies a particular document associated with the attribute (e.g., may provide a link, such as a hyperlink, to the document), may provide information that identifies a particular section of a document that includes an attribute (e.g., may highlight, and present the section for display), or the like. In this way, intelligence platform 215 may assist a user in analyzing attributes associated with the entity and/or verifying the accuracy of an attribute, an association of an attribute, or the like. Additionally, in this way, intelligence platform 215 may reduce a quantity of processing needed to perform a search for information identifying an attribute, thereby conserving processor and/or memory resources of client device 205.

Additionally, or alternatively, intelligence platform 215 may cause a financial position to be modified based on an identified attribute. For example, intelligence platform 215 may cause a market order, a limit order, a stop order, or the like, to be placed regarding a security associated with the entity. For example, assume that an entity is associated with a particular attribute (e.g., a financial statistic, a product, a service, a strength, a weakness, an opportunity, a threat, or the like). In some implementations, intelligence platform 215 may cause a financial position to be modified (e.g., may place an order for a security or may prevent a security from being acquired) based on an attribute associated with an entity.

Additionally, or alternatively, intelligence platform 215 may cause a product and/or a service, associated with an entity, to be purchased and/or requested based on an attribute associated with the entity. For example, intelligence platform 215 may identify particular attributes associated with the entity, and may generate a score associated with the entity based on the attributes (e.g., based on one or more financial statistics, based on products and/or services offered by the entity, or the like). In some implementations, the score may measure a viability of an entity to perform a service, provide a product, or the like. Additionally, intelligence platform 215 may identify related entities (e.g., competitors), and may determine respective scores for the related entities (e.g., based on attributes associated with the related entities). Additionally, intelligence platform 215 may determine a particular entity (e.g., either the entity or a related entity) that is associated with a particular score (e.g., a top score, a score that satisfies a threshold, or the like), and may cause a product and/or service to be requested from the particular entity.

Additionally, or alternatively, intelligence platform 215 may cause a product and/or a service, associated with another entity, to be purchased and/or requested based on an attribute associated with the entity. For example, assume that intelligence platform 215 determines that a score associated with a particular entity satisfies a threshold value, and/or that a variance in scores satisfies a threshold value (e.g., assume that an entity is associated with negative financial performance across a time frame). In this case, intelligence platform 215 may cause services associated with the entity to be discontinued, and/or may cause a service to be requested in association with another entity. In this way, intelligence platform 215 may minimize risk associated with an entity based on identifying particular attributes.

In this way, intelligence platform 215 may increase the speed and accuracy of report generation, which may assist a user in identifying particular information associated with an entity. Additionally, implementations described herein may conserve processor and/or memory resources by reducing a quantity of processing needed to perform report generation.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
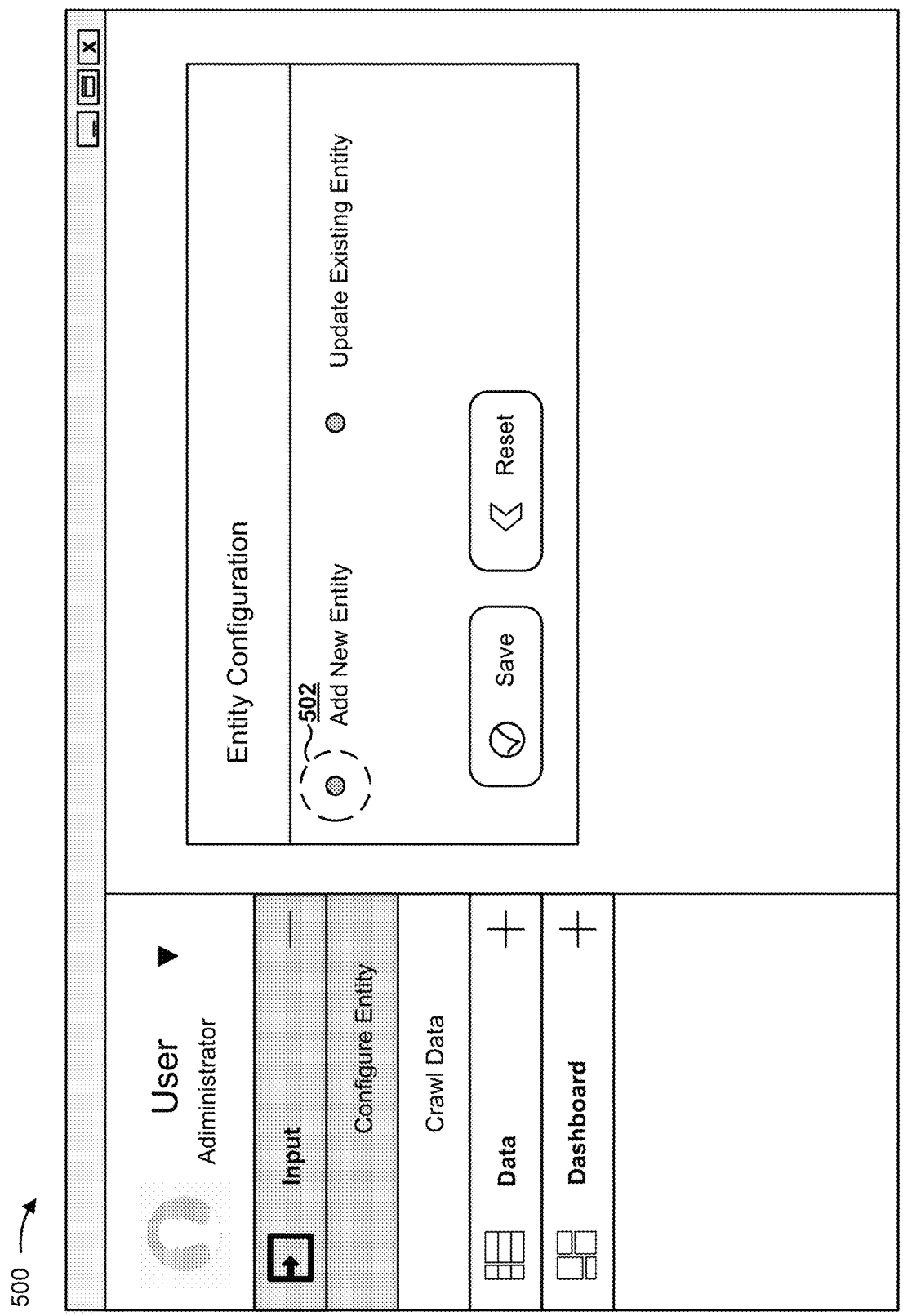
FIGS. 5A-5N are diagrams of an example implementation relating to the example process shown in FIG. 4.
Figure 5B:
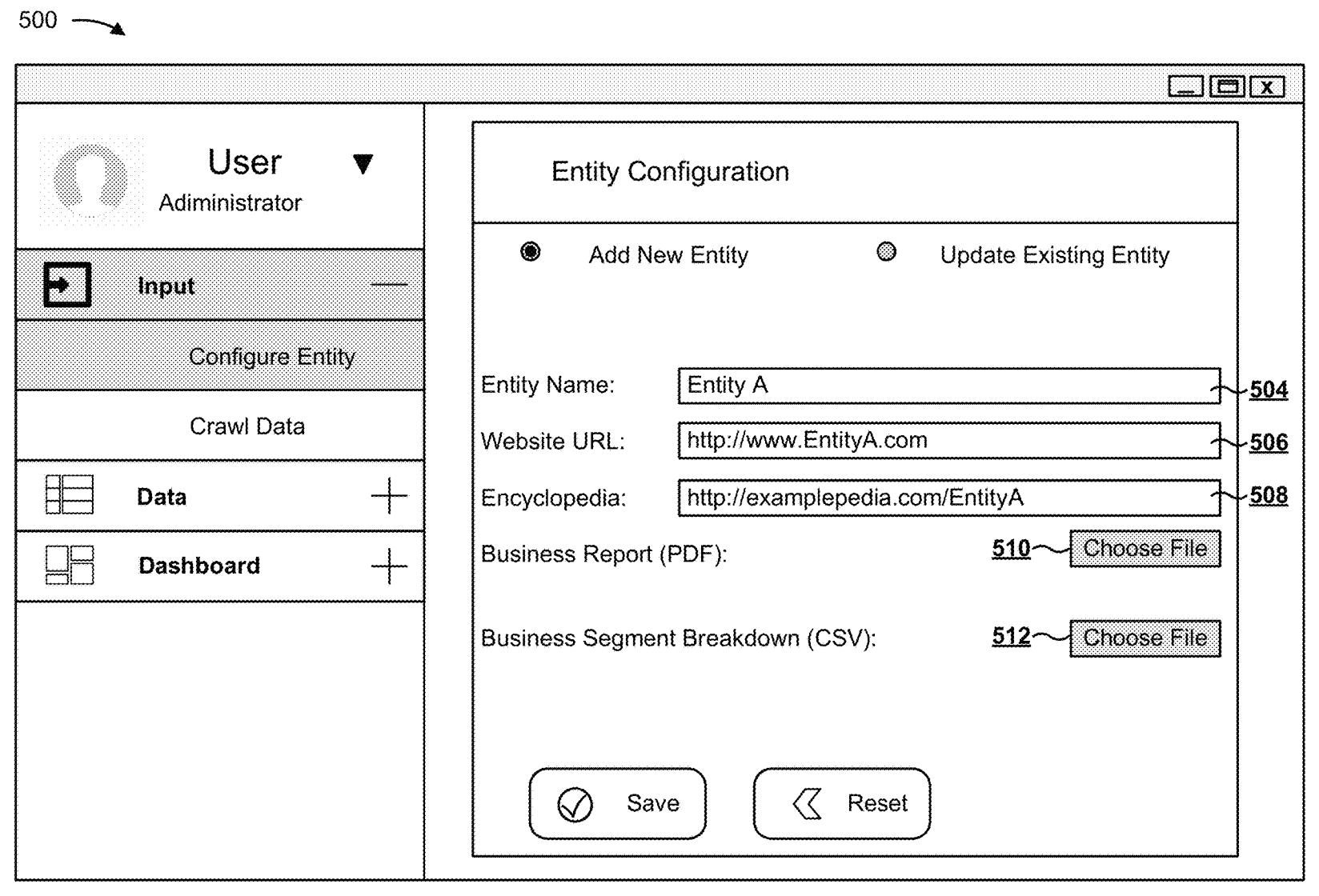
Figure 5C:
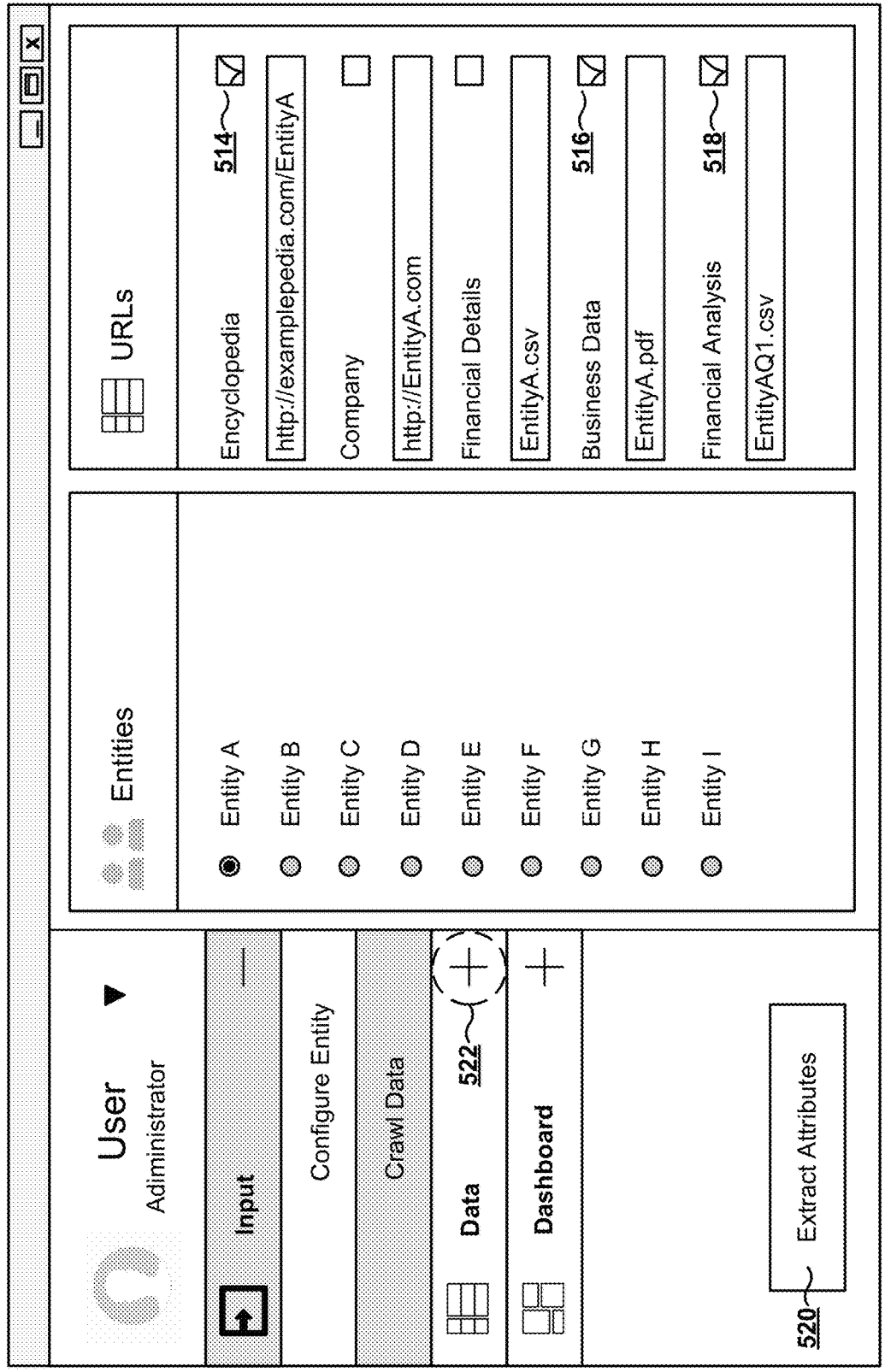
Figure 5D:
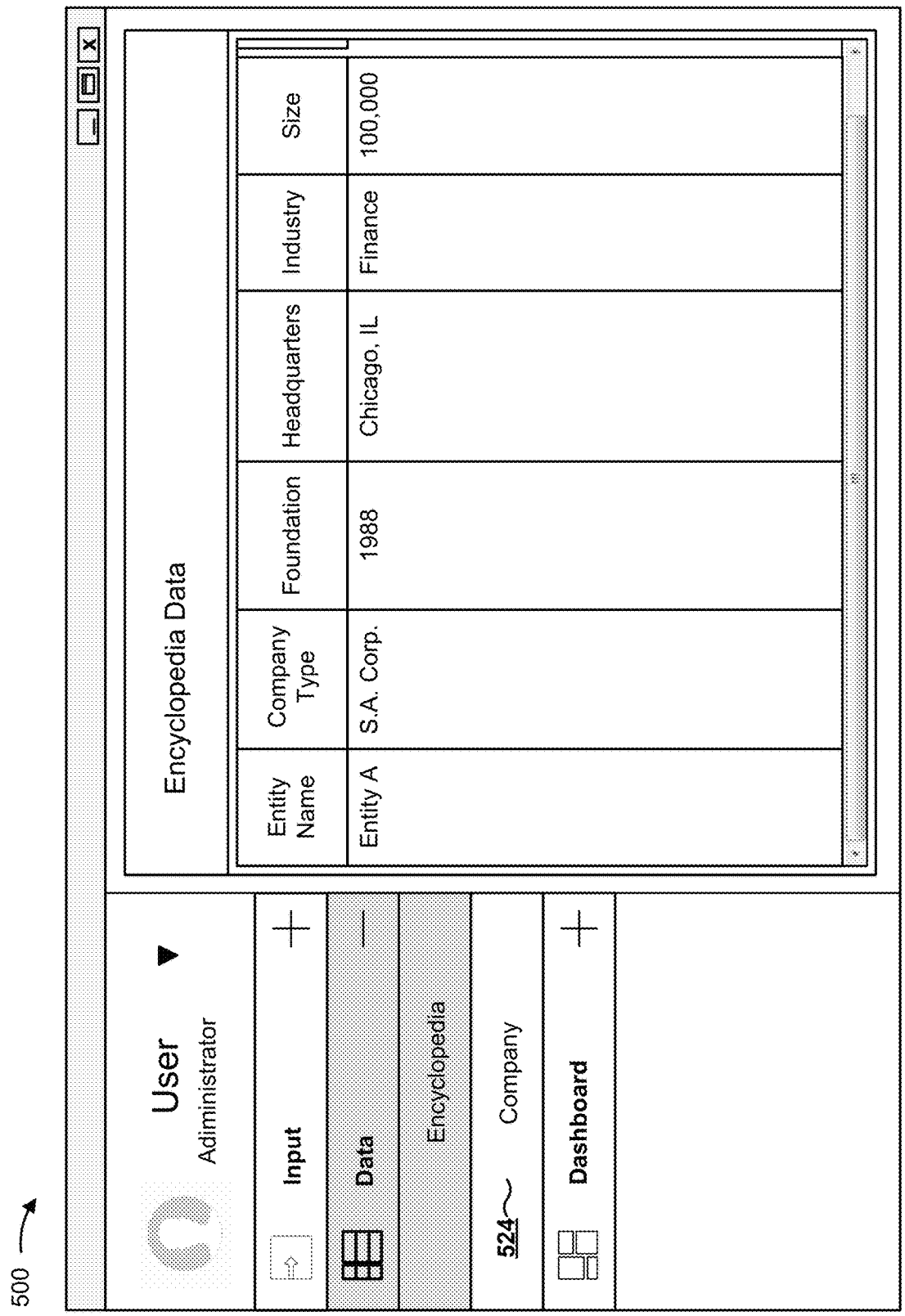
Figure 5E:
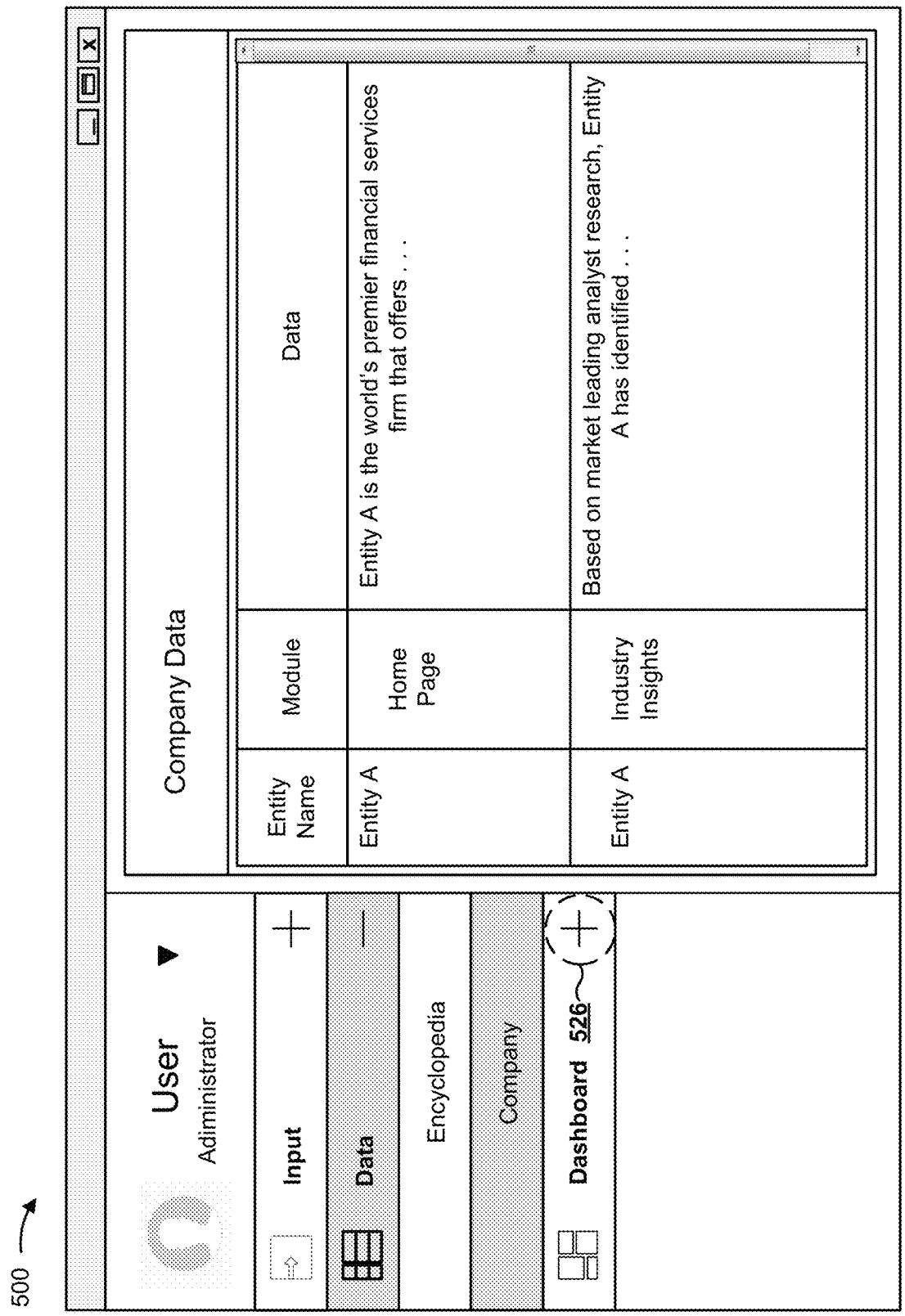
Figure 5F:
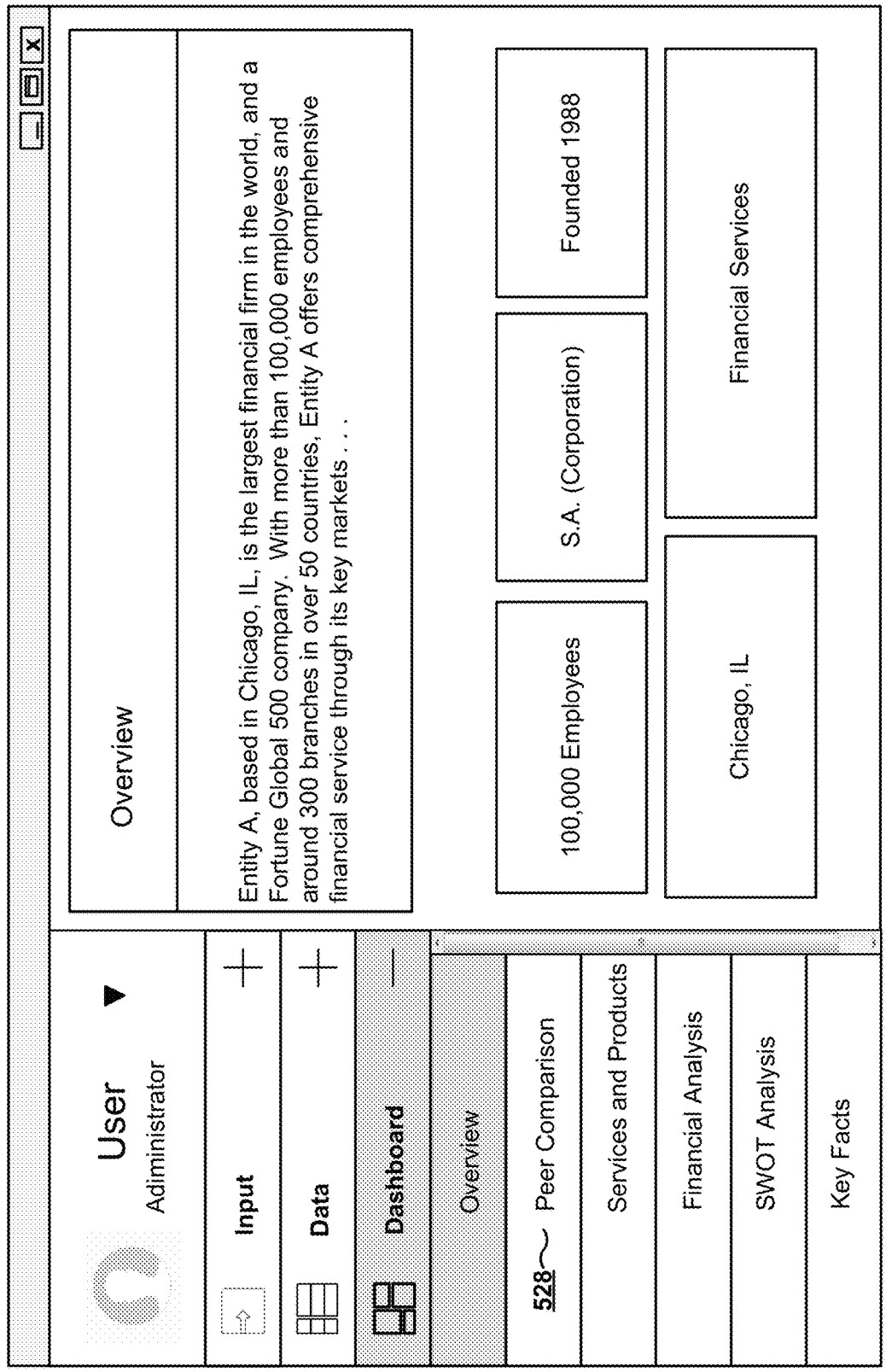
Figure 5H:
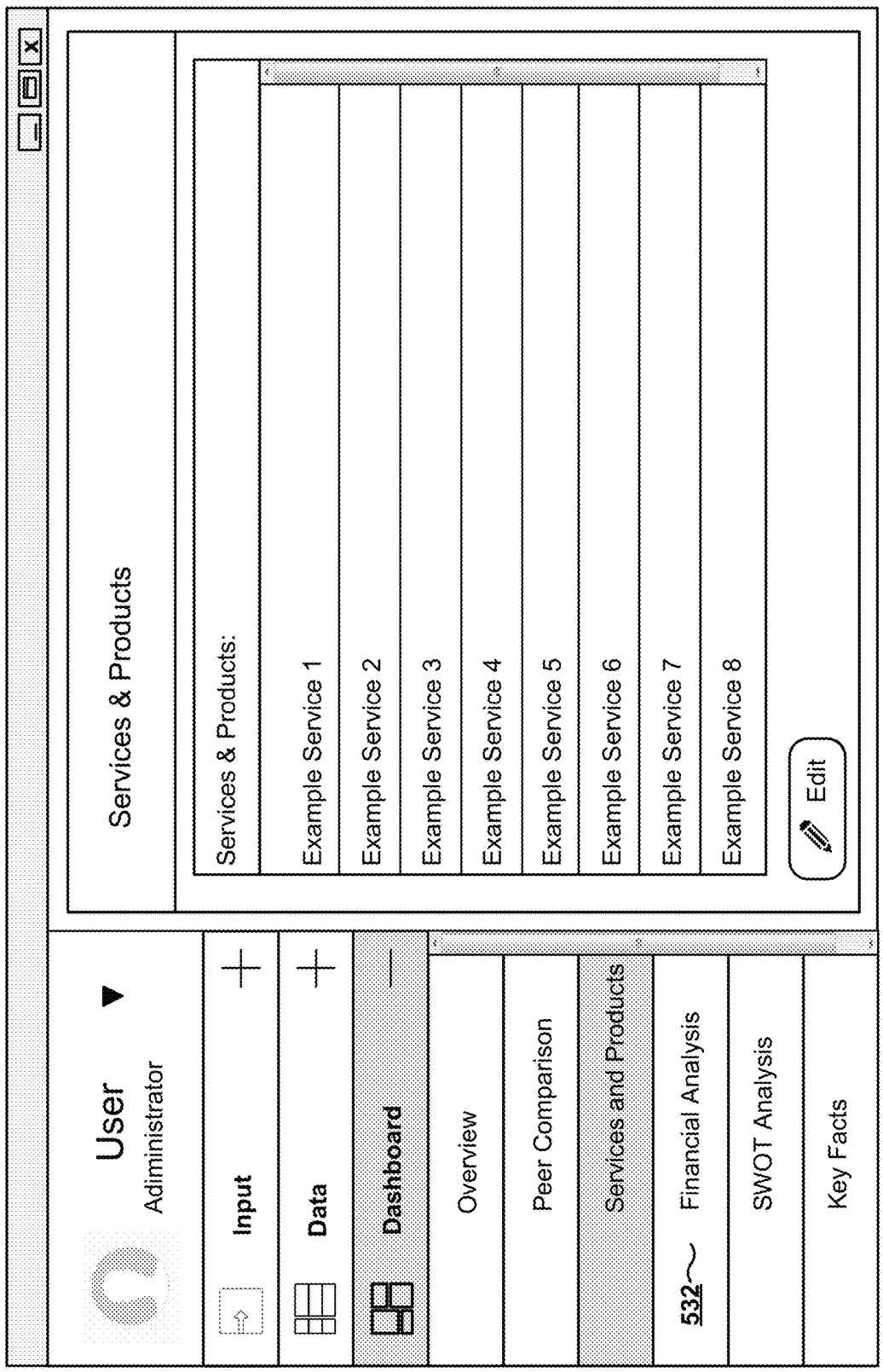
Figure 5K:
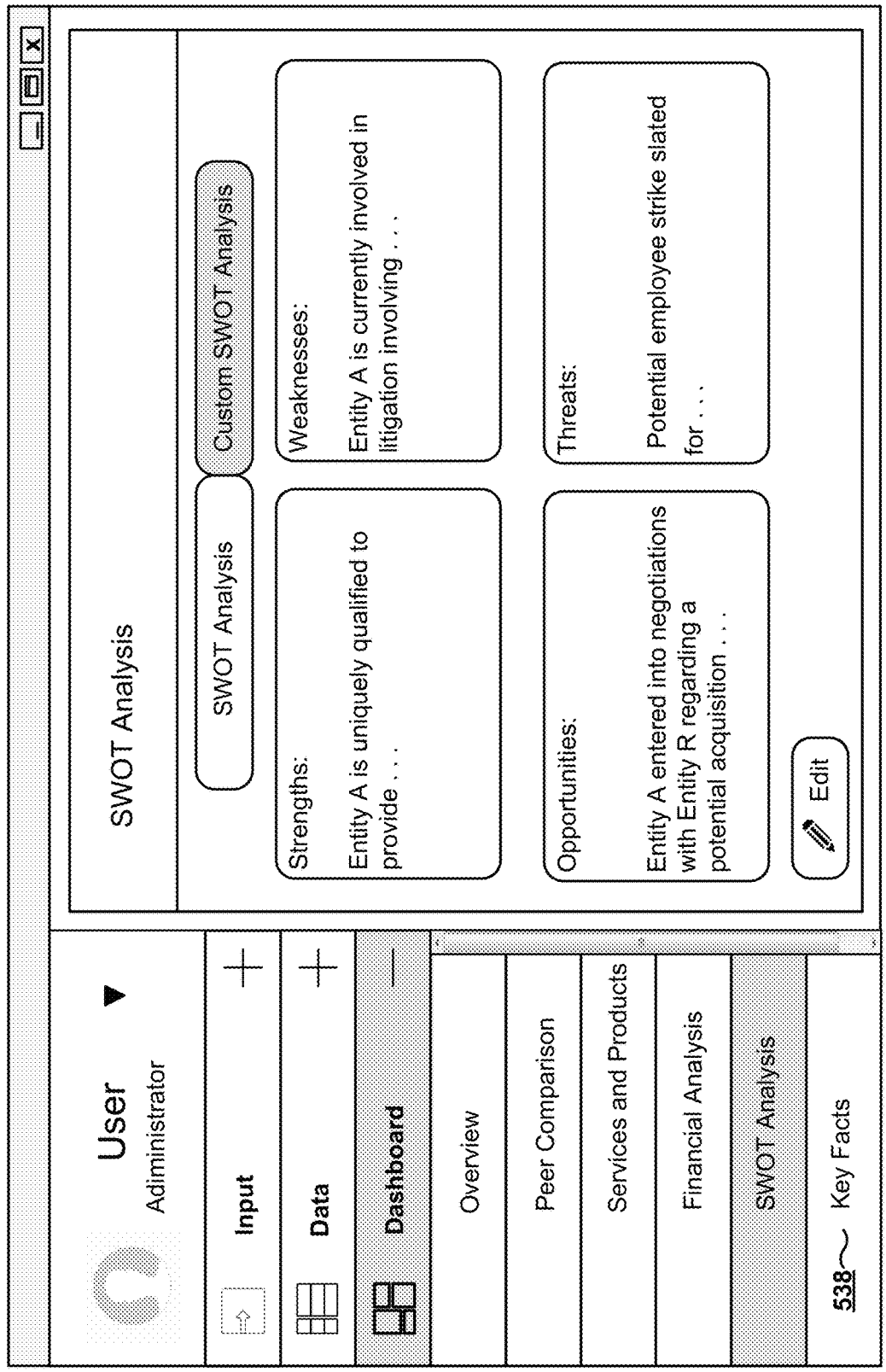
Figure 5L:
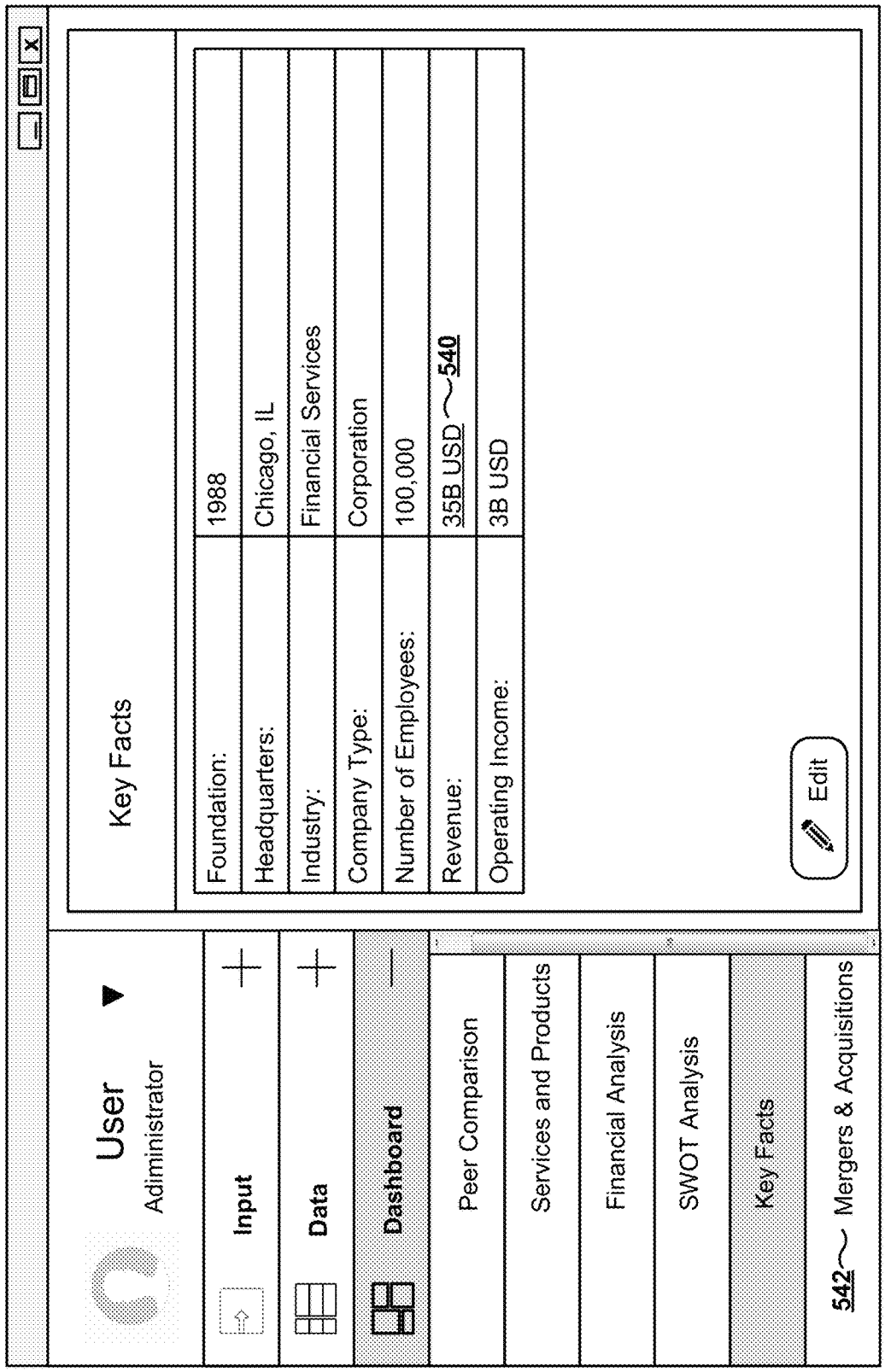
Figure 5M:
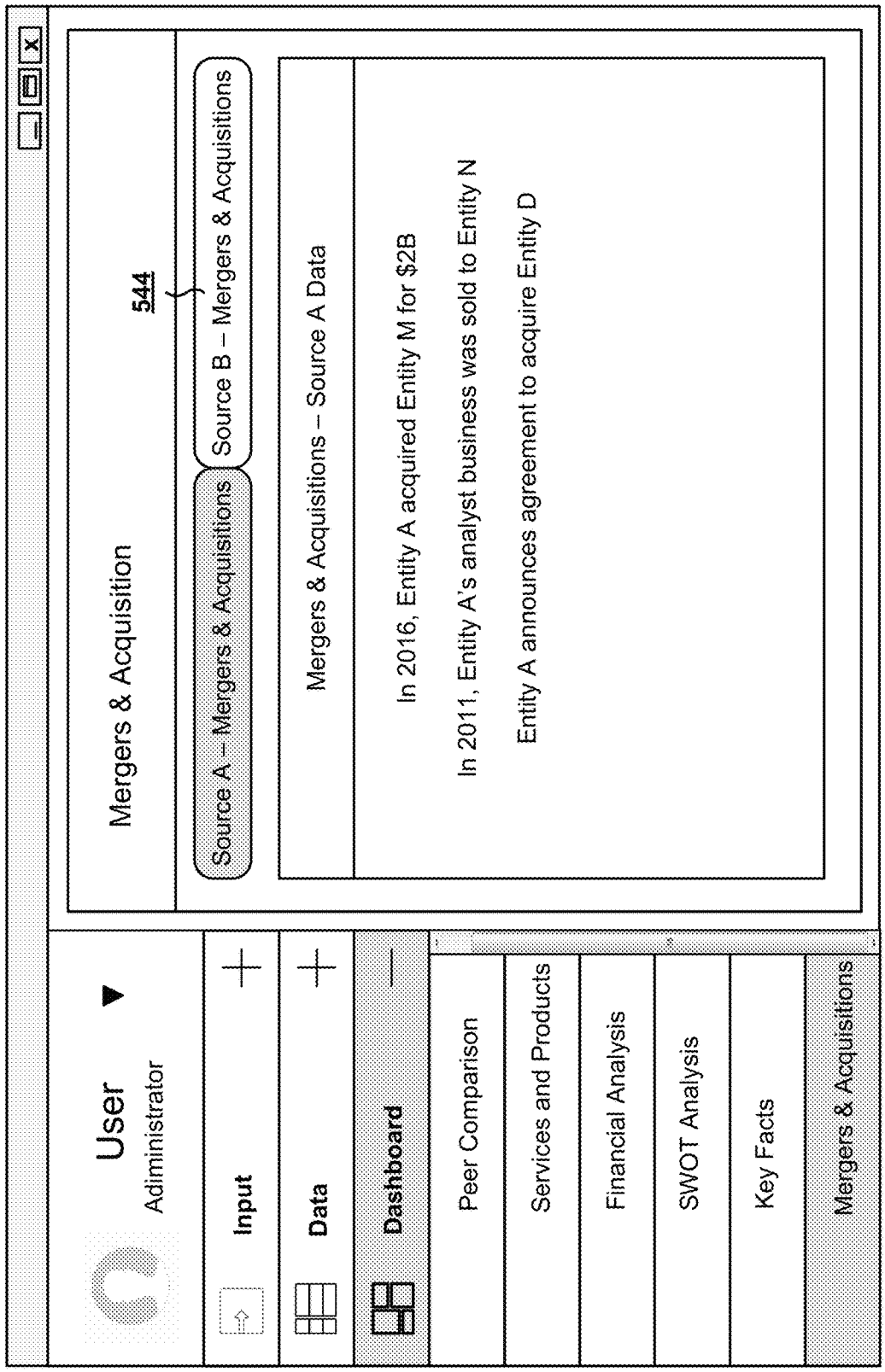
Figure 5N:
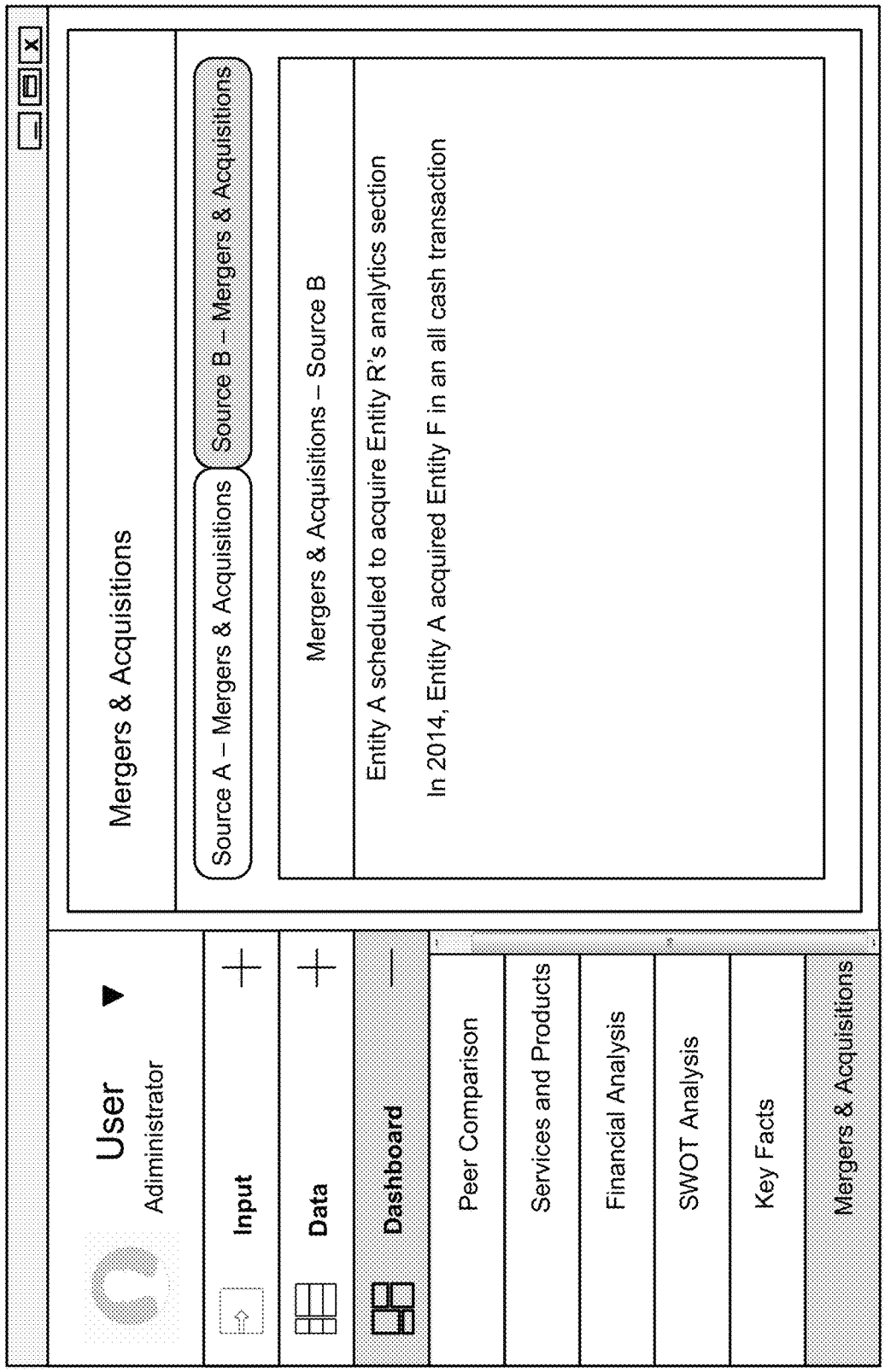

FIGS. 5A-5N are diagrams of an example implementation 500 relating to example process 400 shown in FIG. 4. FIGS. 5A-5N show an example of generating a report. Assume that FIGS. 5A-5N include intelligence platform 215 and client device 205 (e.g., being used by a user). As shown in FIGS. 5A-5N, intelligence platform 215 may provide information for display via a user interface (e.g., via client device 205) and/or may receive information based on a user interaction with the user interface.

As shown in FIG. 5A, intelligence platform 215 may enable a user to input information associated with a new entity. For example, as shown by reference number 502, assume that a user interacts with a menu item (e.g., "Add New Entity"). As shown in FIG. 5B, intelligence platform 215 may enable a user to provide configuration information associated with the entity (e.g., create a profile associated with the entity). For example, as shown by reference numbers 504-512, a user may interact with client device 205 to input information associated with the entity (e.g., input an entity identifier, input multiple URLs, upload resources, etc.). Intelligence platform 215 may store a profile associated with the entity, and may enable a user to modify the profile (e.g., input additional information, upload additional resources, remove particular information, reset information, etc.).

As shown in FIG. 5C, intelligence platform 215 may enable a user to specify particular information that may be used for attribute extraction. For example, as shown by reference numbers 514-518, assume that a user interacts with menu items to select particular information (e.g., resources) for which to perform attribute extraction. Additionally, as shown, intelligence platform 215 may provide a list of entities for display, which may enable a user to select a particular entity (e.g., associated with a respective profile) for which to perform attribute extraction. As shown by reference number 520, assume that a user interacts with a menu item (e.g., "Extract Attributes"). In this case, intelligence platform 215 may perform attribute extraction using the particular information (e.g., may perform a natural language processing technique using selected resources associated with the entity). As shown by reference number 522, assume that a user interacts with a menu item associated with a "Data" tab.

As shown in FIGS. 5D-5N, assume that intelligence platform 215 receives information associated with the entity (e.g., based on a user input), performs attribute extraction (e.g., using a natural language processing technique), and associates particular attributes with particular elements. Additionally, as shown in FIGS. 5D-5N, assume that intelligence platform 215 provides information associated with the entity (e.g., for display via client device 205).

As shown in FIG. 5D, intelligence platform 215 may provide information associated with an encyclopedia webpage associated with the entity. For example, as shown, intelligence platform 215 may identify particular attributes (e.g., a company type, a foundation date, a headquarters location, an industry, a quantity of employees associated with the entity, etc.) based on the encyclopedia webpage, and may provide information that identifies the attributes for display in association with corresponding elements. As shown by reference number 524, assume that a user interacts with a "Company" menu item.

As shown in FIG. 5E, intelligence platform 215 may provide information associated with another resource (e.g., webpages associated with the entity). For example, as shown, intelligence platform 215 may identify particular attributes associated with the entity based on particular resources associated with the entity (e.g. particular webpages associated with the entity). As shown, intelligence platform 215 may identify attributes associated with different webpages of the entity (e.g., a "Home Page" webpage and an "Industry Insights" webpage). As shown by reference number 526, assume that a user interacts with a "Dashboard" menu item.

As shown in FIG. 5F, intelligence platform 215 may provide overview information associated with the entity. For example, intelligence platform 215 may extract attributes (e.g., a quantity of employees, a headquarters location, an entity description, etc.) based on particular resources, and may associate the attributes with corresponding elements (e.g., a company size element, a location element, or the like) and/or may associate the attributes with an "Overview" element. As shown by reference number 528, assume that a user interacts with a "Peer Comparison" menu item.

As shown in FIG. 5G, intelligence platform 215 may provide information that identifies related entities. For example, assume that intelligence platform 215 extracts attributes (e.g., related entities) associated with the entity. As shown, intelligence platform 215 may provide a list of entities (e.g., including the entity and related entities), and may provide attributes associated with the entities (e.g., company names, sales figures, etc.). For example, intelligence platform 215 may extract attributes (e.g., related entities, such as competitors) and may associate the attributes with a particular element (e.g., a related entities element). In this way, a user may identify particular related entities and/or may compare the entity and related entities based on attributes. As shown by reference number 530, assume that a user interacts with a "Services and Products" menu item.

As shown in FIG. 5H, intelligence platform 215 may provide information that identifies services and/or products associated with the entity. For example, intelligence platform 215 may extract attributes (e.g., services and/or products offered by the entity), and may associate the attributes with a particular element (e.g., a services and products element). As shown by reference number 532, assume that a user interacts with a "Financial Analysis" menu item.

As shown in FIG. 5I, intelligence platform 215 may provide information that identifies financial statistics associated with the entity. For example, intelligence platform 215 may extract attributes (e.g., financial statistics associated with particular categories, sub-categories, and time frames), and may associate the attributes with a particular element (e.g., a financial analysis element). As shown by reference number 534, assume that a user interacts with a "SWOT Analysis" menu item.

As shown in FIG. 5J, intelligence platform 215 may provide information that identifies strengths, weaknesses, opportunities, and/or threats (SWOTs) associated with the entity. For example, intelligence platform 215 may extract attributes (e.g., SWOT attributes) based on a particular resource or a set of resources (e.g., a resource associated with a third party entity that provides SWOT analysis), and may associate the attributes with a particular element (e.g., a SWOT analysis element). As shown by reference number 536, assume that a user interacts with a "Custom SWOT analysis" menu item.

As shown in FIG. 5K, intelligence platform 215 may provide information that identifies SWOT features based on implementing a particular technique. For example, intelligence platform 215 may implement a machine learning technique, and may identify SWOT attributes based on the machine learning technique (e.g., based on identifying particular patterns, etc. using a model). In this case, intelligence platform 215 may extract particular attributes and may associate the attributes with a particular element (e.g., a SWOT element, and/or a particular sub-element associated with the SWOT element, such as a strength element, etc.) based on implementing the technique. Additionally, intelligence platform 215 may identify SWOT attributes based on using a different resource than as described above in connection with FIG. 5J. As shown by reference number 538, assume that a user interacts with a "Key Facts" menu item.

As shown in FIG. 5L, intelligence platform 215 may provide information that identifies attributes associated with a particular element (e.g., "Key Facts") or elements (e.g., sub-elements, such as a foundation element, a headquarters element, etc.). For example, as shown, intelligence platform 215 may extract attributes associated with a "foundation" element, a "headquarters" element, etc. As shown by reference number 540, intelligence platform 215 may provide a hyperlink in association with a particular attribute (e.g., "35B USD"). In some implementations, a user may interact with the hyperlink, and intelligence platform 215 may provide a resource (e.g., a document for display) based on the interaction. For example, intelligence platform 215 may provide a resource from which the attribute was extracted. While a particular attribute is shown as being associated with a hyperlink, intelligence platform 215 may provide other hyperlinks in association with other attributes and/or in association with other user interface screens. As shown by reference number 542, assume that a user interacts with a "Mergers & Acquisitions" menu item.

As shown in FIG. 5M, intelligence platform 215 may provide information that identifies attributes associated with a "Mergers & Acquisitions" element. For example, as shown, intelligence platform 215 may extract attributes using a particular source (e.g., "Source A"), and may associate the attributes with a particular element (e.g., "Mergers & Acquisitions"). As shown by reference number 544, assume that a user interacts with a "Source B—Mergers & Acquisitions" menu item.

As shown in FIG. 5N, intelligence platform 215 may provide information that identifies attributes associated with a "Mergers & Acquisition" element, that were extracted using a different source than as described above in connection with FIG. 5M (e.g., using "Source B"). For example, as shown, intelligence platform 215 may extract attributes, and may associate the attributes with a "Mergers & Acquisitions" element.

In some implementations, intelligence platform 215 may generate a report that includes the information (e.g., information displayed in connection with FIGS. 5D-5N). Additionally, or alternatively, a user may interact with client device 205 (e.g., via a user interface), and may select particular elements, particular attributes, etc. to be included in a report. Additionally, or alternatively, a user may interact with client device 205 to modify the information associated with the entity (e.g., remove information, add information, indicate infographics to be generated from information, or the like). Additionally, intelligence platform 215 may generate a report based on the user selections and/or modifications. In this way, a user may provide the report to another user (e.g., a client, a partner, a supervisor, etc.), and/or may utilize the report to determine an action associated with the entity (e.g., assess a viability of the entity to perform a service, provide a product, etc.).

In this way, intelligence platform 215 may receive information associated with an entity (e.g., resources associated with particular sources and/or file types), may extract attributes based on the information, may associate the attributes with elements, and may provide information that identifies the elements and the attributes. As shown, in this way, client device 205 may provide the information for display, which may enable a user to analyze information associated with the entity and make more informed decisions regarding the entity (e.g., identify risks, identify capabilities, etc.).

As indicated above, FIGS. 5A-5N are provided merely as an example. Other examples are possible and may differ from what was described with regard to FIGS. 5A-5N. While some implementations described herein are described in terms of generating a report based on particular elements, implementations described herein may be applied to other report types. In practice, these implementations may be used in conjunction with other types of reports that are associated with an entity.

Implementations described herein enable automated attribute extraction, attribute association, and report generation. In this way, implementations described herein may increase a speed and accuracy of report generation, and may conserve processing resources associated with manual information aggregation.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive information associated with an entity,
the information including a first resource and a second resource,
the first resource being associated with a first file type,
the second resource being associated with a second file type that is different than the first file type,
the first resource being associated with a first source,
the second resource being associated with a second source that is different than the first source, and
the information being received based on a user input,
the user input to include information that identifies at least one of:
an entity identifier, or
a resource identifier;
receive information that identifies classifications associated with one or more text sections of the first resource based on a frequency-inverse document frequency score,
a first term, of the one or more text sections, with a higher frequency-inverse document frequency score representing an attribute with a particular element, and
a second term, of the one or more text sections, with a lower frequency-inverse document frequency score not representing an attribute associated with a particular element;
extract a plurality of attributes associated with the entity based on the frequency-inverse document frequency score,
the device to implement a natural language processing technique to extract the plurality of attributes;
associate the plurality of attributes with a plurality of elements based on extracting the plurality of attributes;
provide information that identifies the plurality of elements and the plurality of attributes, based on associating the plurality of attributes with the plurality of elements, to permit and/or cause an action to be performed;
receive information that identifies a modification of an attribute, of the plurality of attributes, that is associated with an element of the plurality of elements;
implement a machine learning technique based on the information that identifies the modification; and
associate another attribute, of the plurality of attributes, with another element, of the plurality of elements, based on the machine learning technique.

2. The device of claim 1, where the one or more processors are further to:
generate a report based on associating the plurality of attributes with the plurality of elements; and
where the one or more processors, when providing the information that identifies the plurality of elements and the plurality of attributes, are to:
provide the information based on the report.

3. The device of claim 1, where the one or more processors are further to:
identify a pattern that is included in text associated with the first resource; and
where the one or more processors, when extracting the plurality of attributes associated with the entity, are to:
extract an attribute, of the plurality of attributes, based on the pattern.

4. The device of claim 1, where the resource identifier is associated with the first resource.

5. The device of claim 1, where the one or more processors are further to:
receive information associated with another entity;
extract a plurality of other attributes associated with the other entity; and
where the one or more processors, when providing the information that identifies the plurality of elements and the plurality of attributes, are to:
provide information that identifies the plurality of attributes and the plurality of other attributes.

6. The device of claim 1, where the one or more processors are further to:
determine that an attribute, of the plurality of attributes, is associated with the first resource; and
where the one or more processors, when associating the plurality of attributes with the plurality of elements, are to:
associate the attribute with an element, of the plurality of elements, based on the attribute being associated with the first resource.

7. The device of claim 1, where the one or more processors, when associating the plurality of elements and the plurality of attributes, are to:
associate the elements and the plurality of attributes based on implementing the machine learning technique.

8. A non-transitory computer-readable medium storing instructions, the instructions comprising:
one or more instructions that, when executed by one or more processors of one or more devices, cause the one or more processors to:
receive information associated with an entity,
the information being associated with a first resource and a second resource,
the first resource being associated with a first source,
the second resource being associated with a second source that is different than the first source,
the first resource being associated with a first file type,
the second resource being associated with a second file type that is different than the first file type, and
the information being received based on a user input,
the user input to include information that identifies at least one of:
an entity identifier, or
a resource identifier;

receive information that identifies classifications associated with one or more text sections of the first resource based on a frequency-inverse document frequency score,
  a first term, of the one or more text sections, with a higher frequency-inverse document frequency score representing an attribute with a particular element, and
  a second term, of the one or more text sections, with a lower frequency-inverse document frequency score not representing an attribute associated with a particular element;
extract a plurality of attributes based on the frequency-inverse document frequency score information associated with the entity,
  a first subset of attributes, of the plurality of attributes, being associated with the first resource,
  a second subset of attributes, of the plurality of attributes, being associated with the second resource,
  the first subset of attributes being extracted based on a first natural language processing technique, and
  the second subset of attributes being extracted based on a second natural language processing technique;
associate the plurality of attributes with a plurality of elements;
provide information that identifies the plurality of elements and the plurality of attributes, based on associating the plurality of attributes with the plurality of elements, to permit and/or cause an action to be performed;
receive information that identifies a modification of an attribute, of the plurality of attributes, that is associated with an element of the plurality of elements;
implement a machine learning technique based on the information that identifies the modification; and
associate another attribute, of the plurality of attributes, with another element, of the plurality of elements, based on the machine learning technique.

9. The non-transitory computer-readable medium of claim 8, where the one or more instructions, when executed by the one or more processors, further cause the one or more processors to:
generate a score associated with the entity based on the plurality of attributes;
generate another score associated with another entity based on a plurality of other attributes associated with the other entity; and
where the one or more instructions, that cause the one or more processors to provide the information, cause the one or more processors to:
  provide the information to cause the action to be performed in association with the entity based on the score and the other score.

10. The non-transitory computer-readable medium of claim 8, where the one or more instructions, when executed by the one or more processors, further cause the one or more processors to:
identify a pattern associated with a text section,
  the first resource including the text section; and
where the one or more instructions, that cause the one or more processors to associate the plurality of attributes with the plurality of elements, cause the one or more processors to:
  associate an attribute, of the plurality of attributes, with an element, of the plurality of elements, based on the pattern.

11. The non-transitory computer-readable medium of claim 8, where the one or more instructions, when executed by the one or more processors, further cause the one or more processors to:
generate a report based on the plurality of attributes and the plurality of elements; and
where the one or more instructions, that cause the one or more processors to provide the information that identifies the plurality of elements and the plurality of attributes, cause the one or more processors to:
  provide the information based on the report.

12. The non-transitory computer-readable medium of claim 8, where the one or more instructions, when executed by the one or more processors, further cause the one or more processors to:
identify a particular term associated with a text section, of the one or more text sections; and
where the one or more instructions, that cause the one or more processors to associate the plurality of attributes with the plurality of elements, cause the one or more processors to:
  associate an attribute, of the plurality of attributes, with an element, of the plurality of elements, based on the particular term.

13. The non-transitory computer-readable medium of claim 8, where the one or more instructions, when executed by the one or more processors, further cause the one or more processors to:
determine a plurality of resource identifiers based on the entity identifier; and
where the one or more instructions, that cause the one or more processors to receive the information associated with the entity, cause the one or more processors to:
  receive the information associated with the entity based on the plurality of resource identifiers.

14. The non-transitory computer-readable medium of claim 8, where the machine learning technique includes one or more of:
  a pattern recognition technique,
  a data mining technique,
  a heuristic technique,
  a supervised learning technique, or
  a classification technique.

15. A method, comprising:
receiving, by a device and from another device via a network, information associated with an entity,
  the information being associated with a plurality of sources,
  the information being associated with a plurality of file types, and
  the information being received based on a user input,
    the user input to include information that identifies at least one of:
      an entity identifier, or
      a resource identifier;
receiving, by the device, information that identifies classifications associated with one or more text sections of a first resource based on a frequency-inverse document frequency score,
  a first term, of the one or more text sections, with a higher frequency-inverse document frequency score representing an attribute with a particular element, and a second term, of the one or more text sections, with a lower frequency-inverse document frequency score not representing an attribute associated with a particular element;

extracting, by the device, a plurality of attributes associated with the entity based on the frequency-inverse document frequency score, the device to extract the plurality of attributes based on a natural language processing technique;

associating, by the device, the plurality of attributes with a plurality of elements based on extracting the plurality of attributes;

providing, by the device, information that identifies a report based on associating the plurality of attributes with the plurality of elements, the report including a particular format, and the plurality of elements and the plurality of attributes being provided in association with the particular format;

receiving, by the device, information that identifies a modification of an attribute, of the plurality of attributes, that is associated with an element of the plurality of elements;

implementing, by the device, a machine learning technique based on the information that identifies the modification; and associating, by the device, another attribute, of the plurality of attributes, with another element, of the plurality of elements, based on the machine learning technique.

16. The method of claim 15,
where receiving the information associated with the entity comprises:
receiving the information based on the resource identifier,
a first subset of the information associated with the entity to be received at a first time using the resource identifier, and
a second subset of the information associated with the entity to be received at a second time using the resource identifier.

17. The method of claim 15, further comprising:
identifying another entity associated with the entity;
determining a plurality of other attributes associated with the other entity; and
where providing the information that identifies the report comprises:
providing the information that identifies the report based on the plurality of other attributes,
the report to include information that identifies the other entity and the plurality of other attributes.

18. The method of claim 15, further comprising:
determining a score associated with the entity based on the plurality of attributes; and
causing an action to be performed in association with the entity based on the score.

19. The method of claim 15, where the plurality of elements includes at least one of:
a related entity element for attributes relating to entities that are associated with the entity;
a services element for attributes relating to services provided by the entity;
a financial statistics element for attributes relating to financial statistics of the entity;
a strengths, weaknesses, opportunities, and threats element for attributes relating to business information of the entity; or
a mergers and acquisitions element for attributes relating to entity mergers and acquisitions associated with the entity.

20. The method of claim 15, further comprising:
generating a profile associated with the entity based on the information associated with the entity,
the profile to store information associated with the entity.

* * * * *